United States Patent
Cheung et al.

(10) Patent No.: US 9,994,127 B2
(45) Date of Patent: Jun. 12, 2018

(54) COMFORTABLE SEATING ARRANGEMENTS WITH EASY ACCESS

(71) Applicant: IpVenture, Inc., Los Altos, CA (US)

(72) Inventors: Kwok Wai Cheung, Hong Kong (CN); Peter P. Tong, Mountain View, CA (US); C. Douglass Thomas, Saratoga, CA (US)

(73) Assignee: IpVenture, Inc., San Jose, CA (US)

( * ) Notice: Subject to any disclaimer, the term of this patent is extended or adjusted under 35 U.S.C. 154(b) by 0 days. days.

(21) Appl. No.: 14/211,828

(22) Filed: Mar. 14, 2014

(65) Prior Publication Data

US 2014/0197667 A1 Jul. 17, 2014

Related U.S. Application Data

(63) Continuation of application No. 12/284,995, filed on Sep. 27, 2008, now Pat. No. 8,678,311, which is a
(Continued)

(51) Int. Cl.
*B60N 2/02* (2006.01)
*B64D 11/06* (2006.01)
(Continued)

(52) U.S. Cl.
CPC ............ *B60N 2/0292* (2013.01); *B60N 2/06* (2013.01); *B60N 2/22* (2013.01); *B64D 11/00* (2013.01);
(Continued)

(58) Field of Classification Search
CPC .. B64D 11/064; B64D 11/0601; B64D 33/00; B64D 33/0078; B64D 11/00; B60N 2/01;
(Continued)

(56) References Cited

U.S. PATENT DOCUMENTS 2,808,787 A 10/1957 Murphy
2,081,529 A 5/1960 Canney
(Continued)

FOREIGN PATENT DOCUMENTS

| CN | 1132711 A | 10/1996 |
|---|---|---|
| EP | 1010617 A2 * | 6/2000 |
| GB | 2 295 962 A | 6/1996 |

OTHER PUBLICATIONS

First Office Action for Chinese Patent Appln. No. 20060006287.2 dated Nov. 21, 2008.
(Continued)

*Primary Examiner* — Christopher P Ellis
*Assistant Examiner* — Magdalena Topolski

(57) ABSTRACT

A seating arrangement with improved seating comfort. In one embodiment, the seating arrangement is for a transportation vehicle. The arrangement includes seats at least having two levels adjacent to single-level seats. The multi-level seats include at least a bottom row of seats and a top row of seats. In one embodiment, the bottom row seats are on a floor; and there is an imaginary horizontal plane that is parallel to the floor, and that at least a part of the top row seats and at least a part of the bottom row seats intersect. The single-level seats include at least two rows, with at least one seat in each row being adjacent to the aisle, to allow passengers to access the single-level seats. In another embodiment, a seating arrangement includes only multi-level seats. In yet another embodiment, a computer-implemented method is applicable to the seats, such as allowing the display of a visual representation of a top-row seat and a bottom-row seat.

29 Claims, 35 Drawing Sheets

Related U.S. Application Data continuation of application No. 11/364,456, filed on Feb. 28, 2006, now Pat. No. 7,448,575.

(60) Provisional application No. 60/656,671, filed on Feb. 28, 2005, provisional application No. 60/737,041, filed on Nov. 15, 2005.

(51) Int. Cl.
  *B64D 11/00* (2006.01)
  *B60N 2/06* (2006.01)
  *B60N 2/22* (2006.01)

(52) U.S. Cl.
  CPC ........ *B64D 11/0601* (2014.12); *B64D 11/064* (2014.12)

(58) Field of Classification Search
  CPC .. B60N 2/0292; B61D 33/00; B61D 33/0078; B63B 2029/043
  See application file for complete search history.

(56) References Cited

U.S. PATENT DOCUMENTS

| | | | |
|---|---|---|---|
| 2,947,349 A | 8/1960 | Kryter | |
| 2,953,103 A | 9/1960 | Bohannon et al. | |
| 4,066,227 A * | 1/1978 | Buchsel | B64D 11/00 105/340 |
| 4,157,797 A | 6/1979 | Fox | |
| 4,936,620 A | 6/1990 | Francois et al. | |
| 5,425,516 A | 6/1995 | Daines | |
| 5,716,026 A | 2/1998 | Pascasio et al. | |
| 6,209,956 B1 | 4/2001 | Dryburgh et al. | |
| 6,237,872 B1 | 5/2001 | Bar-Levav | |
| 6,669,141 B2 | 12/2003 | Schmidt-Schaeffer | |
| 7,025,306 B2 | 4/2006 | Saint Jalmes | |
| 7,213,882 B2 | 5/2007 | Dryburgh et al. | |
| 7,240,943 B2 | 7/2007 | Williamson et al. | |
| 7,448,575 B2 | 11/2008 | Cheung et al. | |
| 7,454,361 B1 | 11/2008 | Halavais et al. | |
| 8,678,311 B2 | 3/2014 | Cheung et al. | |
| 2002/0033432 A1 | 3/2002 | Mikosza | |
| 2004/0195451 A1 | 10/2004 | Bentley et al. | |
| 2004/0232283 A1 | 11/2004 | Ferry et al. | |
| 2005/0004820 A1 | 1/2005 | LeMieux | |
| 2006/0192050 A1 | 8/2006 | Cheung et al. | |
| 2008/0042010 A1 | 2/2008 | Watanabe | |
| 2009/0065642 A1 | 3/2009 | Cheung et al. | |

OTHER PUBLICATIONS

Second Office Action for Chinese Patent Appln. No. 200680006287.2 dated Aug. 11, 2011.
Notice of Allowance for U.S. Appl. No. 12/284,995, dated Oct. 31, 2011.
Non-Final Office Action for U.S. Appl. No. 12/284,995, dated Apr. 9, 2012.
Notice of Allowance for U.S. Appl. No. 12/284,995, dated Jul. 20, 2012.
Office Action for U.S. Appl. No. 12/284,995, dated Nov. 2, 2012.
Advisory Action for U.S. Appl. No. 12/284,995, dated Sep. 11, 2013.
Notice of Allowance for U.S. Appl. No. 12/284,995, dated Nov. 7, 2013.
Notification of Reexamination for Chinese Patent Appln. No. 200680006287.2, dated Dec. 23, 2013.
Restriction Requirement for U.S. Appl. No. 12/284,995, dated Oct. 19, 2010.
Office Action for U.S. Appl. No. 12/284,995, dated Jan. 18, 2011.
Notice of Allowance for U.S. Appl. No. 12/284,995, dated Aug. 4, 2011.
Office Action for U.S. Appl. No. 12/284,995, dated Apr. 24, 2013.
Notice of Allowance for U.S. Appl. No. 12/284,995, dated Feb. 3, 2014.

* cited by examiner

COMFORTABLE SEATING ARRANGEMENTS WITH EASY ACCESS

CROSS-REFERENCE TO RELATED APPLICATION

This application is a continuation of U.S. patent application Ser. No. 12/284,995, filed Sep. 27, 2008, entitled "COMFORTABLE SEATING ARRANGEMENTS WITH EASY ACCESS," now U.S. Pat. No. 8,678,311, which is hereby incorporated herein by reference, and which application is a continuation of U.S. patent application Ser. No. 11/364,456, filed Feb. 28, 2006, now U.S. Pat. No. 7,448,575, entitled "COMFORTABLE SEATING ARRANGEMENTS WITH EASY ACCESS" which is hereby incorporated herein by reference and which claims priority to (i) U.S. Provisional Patent Application No. 60/737,041, filed Nov. 15, 2005, entitled "COMFORTABLE SEATING ARRANGEMENTS WITH EASY ACCESS," and which is hereby incorporated herein by reference; and (ii) U.S. Provisional Patent Application No. 60/656,671, filed Feb. 28, 2005, entitled "COMFORTABLE SEATING ARRANGEMENTS WITH EASY ACCESS," and which is hereby incorporated herein by reference.

BACKGROUND OF THE INVENTION

Field of the Invention

The present invention relates generally to seating arrangements, and more particularly to comfortable multi-level seats that are easy to access.

Description of the Related Art

For most air travelers, getting a good sleep in the skies is always a challenge. Seats are usually squeezed together particularly in the coach sections. During the travel downturn in recent years, carriers have been slimming down their fleets to save money. With increase in demand, airlines have been finding ways to meet demands without adding more planes.

Many airlines have been adding seats, particularly to the international flights. In one year, from 2004 to 2005, international seat capacity has increased by more than 10%. Different designs have been used to increase the capacity. For example, AirTran sticks each passenger's knees into an area in the back of the seat in front to get an extra row of seats on the new 737-700 jets it ordered in 2003. In 2000, American Airlines added more leg room in the coach section. With fliers complaining about paying more for the privilege, American Airlines added seats back onboard. Those few extra seats could add millions of dollars in revenues over the life of the planes.

In addition to getting more seats, airlines are adding more flights to their existing fleets. The number of flights after 11 pm was up more than 20% in September 2004 from a year ago. There are even 19-hour trips on the way. Providing a comfortable resting environment is becoming an urgent matter.

Airlines need to provide more comfort to attract customers. The battleground has moved to the coach section due to the significant drop in high-paying corporate travel and the rise of budget carriers. The focus is typically in the seat design because better seats should win more economy passengers. This can include more foot room underneath and added leg rests.

Air France sells its new economy-class seats by offering more leg support through foot rests and a seat bottom that can slide forward slightly as the back reclines. In 2003, JetBlue decided to remove the last row of seats because they cannot recline fully. This allows JetBlue to add leg room, but only for the back 16 rows. On certain flights using Airbus A330s, Northwest Airlines provides each coach passenger with a video screen, a headrest that flips out to help sleeping, a bottom cross-bar that moves forward to give more shin room under the seat in front, and a lowered cushion to relieve pressure on the thighs.

Though many airlines are trying to improve their coach seats, due to the cramped coach space, the coach seats are still far inferior in comfort as compared to the business class seats and the first class seats. The business class and first class seats can better conform to typical resting or sleeping profile of the passengers. The seat backs can be significantly tilted and the leg rests can be tilted as well.

Many airlines are also providing different amenities to help people sleep. For example, Continental spent $26,000 on each of its new international seats for first class passengers, which translates to more than a million a plane. Having comfortable seats is only one factor. Other airlines have been providing warm milk, extra pillows, adjustable headrests and cabin temperatures more suitable for sleeping. Northwest and US Airways even limit to two announcements for certain 4-hour-red-eye flights.

However, no matter what the airlines provide, passengers are bound to leave their seats from time to time. If a coach passenger in an interior seat, such as a window seat, wants to go to the lavatory, a passenger at the aisle seat has to stand up to allow the interior passenger to pass through. The passenger in an aisle seat thus is likely to be disturbed and will have difficulty sleeping.

It should be apparent from the foregoing that there is still a need for better seating comfort particularly for the coach passengers, but still can allow airlines to carry similar numbers of seats. Furthermore, it is desirable that the seating arrangements allow interior passengers to access to aisles without requiring other passengers to move.

SUMMARY OF THE INVENTION

A number of embodiments of the present invention provide comfortable seating arrangements with easy access even for passengers in interior seats. Passengers in interior seats can have easy access to aisles without requiring passengers in aisle seats to stand up. Moreover, in a number of embodiments, such advantageous seating arrangements can be achieved without the need to increase the dimensions of existing seating compartments.

In the following, seats in aircrafts are used as illustrations, though the present invention can be applied to seats in other types of moving vehicles, such as trains, buses, vans or boats. Different embodiments of the inventive seating arrangements can also be used in a stationary environment, such as seats in public waiting areas or at homes, or in spaces that are valuable or where using such spaces are not free. The inventive seating arrangements provide passenger comfort, easy access and can also increase seating capacity.

In a first embodiment, seats are arranged in rows, with at least a first bottom row and a first top row.

Each row has at least two seats, an aisle seat and an interior seat. The two seats are next to each other. A seat is an aisle seat if it is adjacent to an aisle. A seat is an interior seat if it is not adjacent to an aisle or if it is further away from the aisle. The aisle seat restricts a passenger sitting in its corresponding interior seat from having direct access to the aisle.

Each seat has a seat back, a leg rest and at least a takeoff and a resting position. When a seat is in its takeoff position, its seat back can be substantially upright relative to its seat base. When a seat is in its resting position, its seat back can be tilted by more than 35 degrees.

The interior seat in the first bottom row can be slidably mounted on a floor to allow the seat to at least move in the forward and backward directions.

A passenger in the interior seat of the first top row can walk to the aisle through an access open space, which is in front of the top row aisle seat. At least a portion of the access open space of the first top row is below the top end of the seat back of the first bottom aisle seat, when the aisle seat is in its takeoff position.

Similarly, a passenger in the interior seat of the first bottom row can walk to the aisle again through an access open space.

An access open space is at least six inches deep by five feet six inches high by the width of an aisle seat.

Also, an access open space allows a passenger in an interior seat to walk to the aisle without requiring any passenger in the corresponding aisle seat of that row to stand up. In other words, the passenger in the interior seat can walk to the aisle without the need to go over any passenger in the aisle seat, even when the aisle seat is in its resting position.

In another embodiment, the first embodiment further includes a second bottom row of seats in parallel to the first bottom row, and a second top row of seats in parallel to the first top row. The seats in the two top rows differ by 180 degrees in orientation, and the seats in the two bottom rows also differ by 180 degrees in orientation. In other words, passengers in these different rows are substantially in opposite directions (i.e., they typically face one another). The access open space allowing a passenger in the interior seat of the first bottom row to walk to the aisle is behind the aisle seat of the first bottom row, and can be accessed by moving the interior seat behind the aisle seat of the first bottom row.

In yet another embodiment, the first embodiment further includes a second bottom row of seats in parallel to the first bottom row, and a second top row of seats in parallel to the first top row. The seats in the top and the bottom rows are in the same orientation. The access open space allowing the passenger in the interior seat of the first bottom row to walk to the aisle is behind the aisle seat of the first bottom row, and can be accessed by moving the interior seat behind the aisle seat of the first bottom row.

In a further embodiment, the first embodiment further includes a second bottom row of seats in parallel to the first bottom row, and a second top row of seats in parallel to the first top row. The seats in the two top rows differ by 180 degrees in orientation, and the seats in the two bottom rows also differ by 180 degrees in orientation. In other words, passengers in these different rows are substantially in opposite directions (i.e., they typically face one another). The access open space allowing a passenger in the interior seat of the first bottom row to walk to the aisle is in front of the aisle seat of the first bottom row.

In another embodiment, the access open space of the first embodiment allowing a passenger in the interior seat of the first bottom row to walk to the aisle is the same access open space allowing a passenger in the interior seat of the first top row to walk to the aisle.

In yet another embodiment, instead of just having a top level and a bottom level, the embodiment includes more than two levels of seats.

A number of embodiments have been described regarding comfortable seating arrangements with more than one level of seats. In one embodiment, there is a mixed-seating arrangement. For example, in a transportation vehicle, within the same sitting compartment or section, in one area, the seats are of one level only; while in another area, the seats have more than one level. For the single-level seats, the seats can be similar to a standard seating arrangement, such as in today's airplanes. There can be at least two rows of seats, with one row in front of the other row, but with no seats above or below them. For the multi-level seats, one can use one of the previously described embodiments with more than one level of seats, such as top-level seats and bottom-level seats. The seats can have seat backs. At least a portion of each of the seats in the top level (top-level seats) is below an imaginary flat surface formed by the top point of the seat backs of at least two of the seats in the bottom level (bottom level seats).

Regarding accessing seats in a mixed seating arrangement, for the multi-level seats, at least a bottom-level seat is adjacent to an aisle, which allows passengers to access the multi-level seats. As to the single-level seats, at least one seat in each row is also adjacent to the aisle to allow passengers to access the single-level seats.

Another embodiment of the invention involves a computer-implemented method for a multi-level seating arrangement. At least a section of the seating arrangement includes two levels of seats, a top level and a bottom level. The seats have seat backs. The multi-level seats can be one of the multi-level seating arrangements as previously described. The method includes displaying a visual representation of at least a top-level seat, and a bottom-level seat. Visual representations of different positions or orientations of a seat can also be provided. In one embodiment the method can allow a user to receive different views from the perspective of a user sitting at a seat. In one embodiment, the method allows a user to receive a virtual-guided tour, which can include ways to access a seat from an aisle. In another embodiment, the method allows a user to view the status of a seat. In one embodiment, the method allows a user to reserve a seat remotely through a network. Once the user has reserved the seat, a visual indication can be provided to the user that the seat has been reserved. In one embodiment, the method can be implemented at a website. The website can provide pricing information to a user. The pricing can be variable, such as varying as a function of the type of seat, time, demand and/or neighboring passenger. In one embodiment, there can be a search engine at the website to allow a user to search the website. The search can be based on a template with empty slots having pull-down menus to allow the user to select different entries. In another embodiment, the search can also be based on natural language.

Other aspects and advantages of the present invention will become apparent from the following detailed description, which, when taken in conjunction with the accompanying drawings, illustrates by way of example the principles of the invention.

Same numerals in FIGS. 1-33 are assigned to similar elements in all the figures. Embodiments of the invention are discussed below with reference to FIGS. 1-33. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
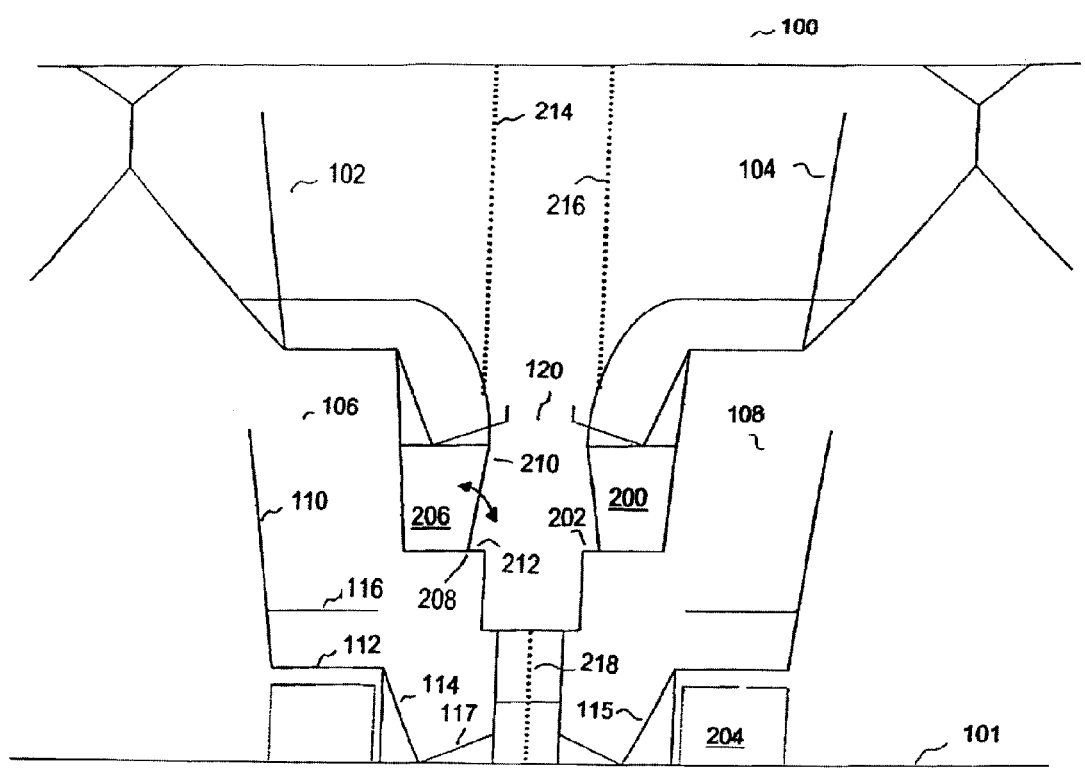
FIG. 1 shows a first embodiment of the present invention, illustrating a portion of a cross section along the fuselage of an aircraft, with seats in a takeoff position.

FIG. 1 shows a first embodiment 100 of the present invention. The figure shows a portion of a cross section along the fuselage of an aircraft, which is used to explain different embodiments of the invention.

Two top rows of seats and two bottom rows of seats shown in the figure are used to explain the first embodiment. The two top rows are parallel to each other, and the two bottom rows are also parallel to each other. There are at least two seats next to each other in each row. However, to help explain the first embodiment, only one seat in each row of seats is shown in the figure.

Of the two seats in each row, one is an aisle seat and the other is an interior seat. The aisle seat is adjacent to an aisle. The aisle is also not shown in the figure. The direction of the aisle can be substantially parallel to the plane of the figure. It can be the corridor for air attendants to transport drinks and food to the passengers, and for passengers to go to a lavatory on the plane. The interior seat is further away from the aisle. The aisle seat restricts a passenger sitting in the interior seat from having direct access to the aisle.

FIG. 1 only shows one set of seats, such as four aisle seats, two of them, seats 102 and 104, for the top rows, and two of them, seats 106 and 108, for the bottom rows. Next to each of the aisle seat is an interior seat (not shown), and adjacent to the aisle seats is the aisle.

Typically, each seat includes a seat back, a seat base, a leg rest and two arm rests, such as the seat back 110, the seat base 112, the leg rest 114 and one arm rest 116 of one of the bottom aisle seat 106. In one embodiment, the leg rest 114 can be tilted and have a sole rest 117 as shown in FIG. 1. In another embodiment, the leg rest 114 is the structure below the seat base, and allows, for example, the portions of the legs below the knees to hang down from the seat base. In this another embodiment, the leg rest 114 may not be tilted and may not have a separate sole rest 117—the floor serves as the sole rest.

Seats in the top rows (or top seats) are staggered above seats in the bottom rows (or bottom seats). In one embodiment, a top seat being staggered over a bottom seat implies that the top seat starts before the bottom seat ends, from the vertical perspective. In other words, as shown in FIG. 1, if a horizontal plane sits on top of the seat back of the bottom seats, a portion of the top seats would be below the horizontal plane. In another embodiment, a top seat being staggered over a bottom seat when at least a portion of the leg rest of the top seat is below the top end of the seat back of the bottom seat, when the seats are in their upright position. A seat is in its upright position when its seat back can be substantially perpendicular to its seat base, which can be substantially perpendicular to its leg rest. In other words, the seat back is not reclined. Staggering the seats helps maximize the use of space and increase seating comfort, as will be explained below.

In one embodiment, each seat has at least a resting position. In another embodiment, each seat has at least two positions, a takeoff position and a resting position, and can also have an emergency position. FIG. 1 shows all the seats in their takeoff position. In the takeoff position, the seat back of a seat can be substantially upright relative to its seat base. The leg rest of the seat can be tilted as shown in the figure. In the resting position, the seat back of a seat can be significantly reclined, with its leg rest still being tilted, as to be shown in FIG. 2. In the emergency exit position, the seat back is substantially upright and the leg rest is not tilted, as to be shown in FIG. 3. In yet another embodiment, each seat has a multitude of positions, where the seat can be continually tilted from being substantially upright to being significantly reclined.

In the first embodiment, regarding seats in neighboring bottom rows, they differ by 180 degrees in orientation, and similarly for seats in neighboring top rows. For example, the aisle seat 102 differs by 180 degrees in orientation from its neighboring aisle seat 104. In other words, passengers in neighboring rows can be facing each other, orientation-wise.

In one embodiment, at least the interior bottom seats can be slidably mounted on a floor, allowing the seats to move in the forward and backward directions. For example, the bottom seat 108 can be slidably mounted on a floor 101 provided within the aircraft. Through such movements, neighboring seats can be further apart from or closer to each other. One way to allow such motion is to mount the interior bottom seats on one or more tracks.

For the first embodiment, one approach to mount a bottom seat onto the floor is to mount the seat onto one or more tracks. To lock its position, the seat can be tied or snapped to the floor. This can be done, for example, by having spring-loaded bolts at the seat to be inserted or snapped into holes at the floor. To slide the seat on the track(s), a passenger will pull up the one or more bolts. Then the passenger can move the seat along the track(s). There are a number of set positions for the seats, with corresponding holes on the floor to receive the bolts.

In one embodiment, when seat belts signs are turned on, such as during takeoff or landing, the seats are locked and cannot be slid from one position to another position. Also, during those time, there are a number of specific positions within the set positions for the seats. If the seats are not at the specific positions, the corresponding passengers will be suggested to move the seats back to those positions.

If a top-row passenger in an interior seat would like to walk to or access the aisle, the passenger can walk to the aisle through an access open space 120 that is in front of the corresponding aisle seat. In other words, the passenger in an interior seat can walk to the aisle without requiring any passenger in the corresponding aisle seat of that row to stand up. Unlike existing coach seating arrangements, in the first embodiment, an interior seat passenger does not have to go over a passenger in the corresponding aisle seat, even if the aisle seat is in a resting position.

When the interior passenger from the top row reaches the aisle, there can be one or more steps for the passenger to step down onto the aisle.

In one embodiment, at least a portion of the access open space 120 is below the top end of the seat back of the bottom aisle seats, such as the bottom aisle seats 106 and 108, when the seats are in their takeoff position.

Figure 2:
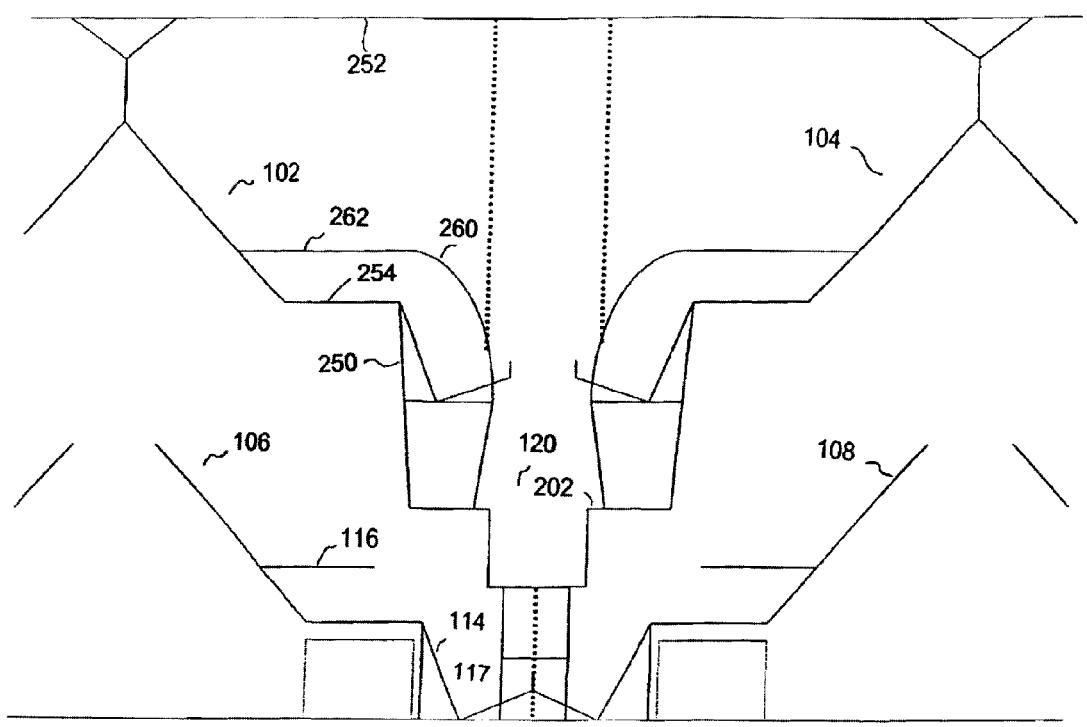
FIG. 2 shows the first embodiment with seats in their resting position.

FIG. 2 shows the first embodiment 100 with seats in their resting position. As shown in the Figure, to optimize space usage, if the seats have movable leg rests or leg rests that can be tilted, at least a portion of the leg rest of each of the bottom seats can extend below the access open space of the top rows. To be in that position, a passenger can slide the seat forward to create more space. The additional space created can be used for tilting the seat back to recline the seat.

Figure 3:
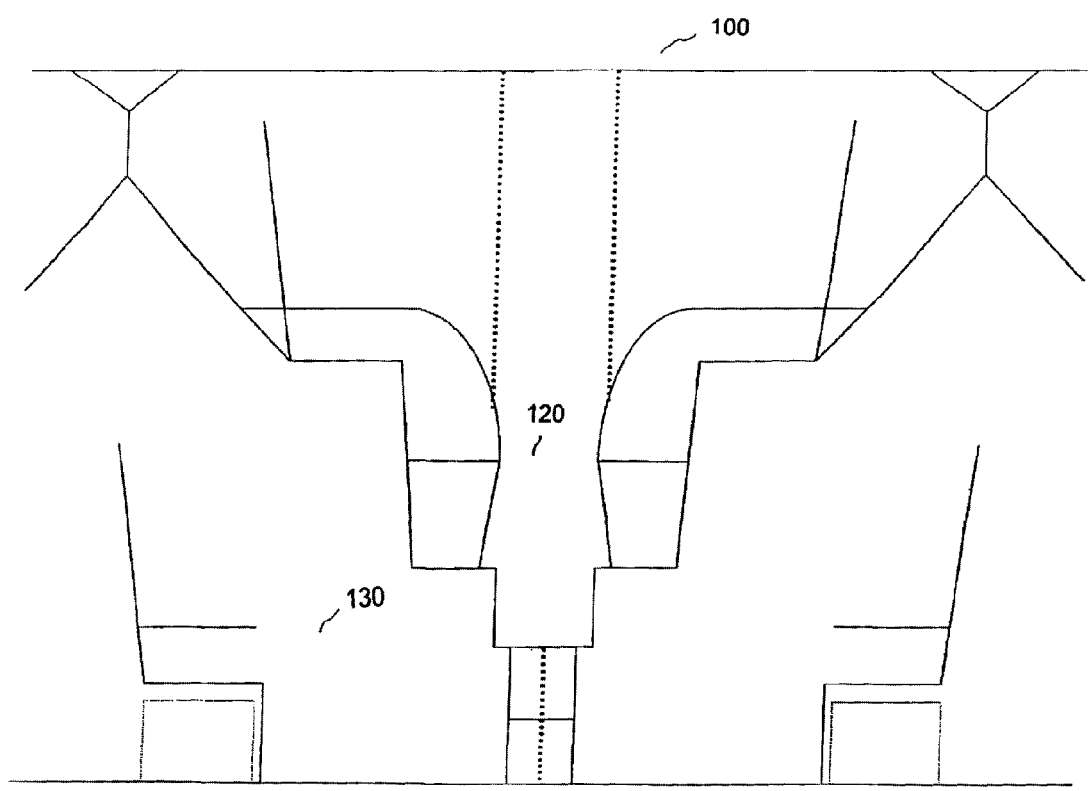
FIG. 3 shows the first embodiment with seats in an emergency exit position and with emergency access open spaces for bottom seats being in front of seats.

FIG. 3 shows the first embodiment 100 with seats in an emergency exit position. In this position, if a bottom-row passenger in an interior seat would like to walk to the aisle, the passenger can walk to the aisle through an emergency access open space 130 that is in front of the corresponding aisle seat. An emergency access open space, such as emergency access open space 130, typically has less head room than a normal access open space, such as access open space 120.

Figure 4:
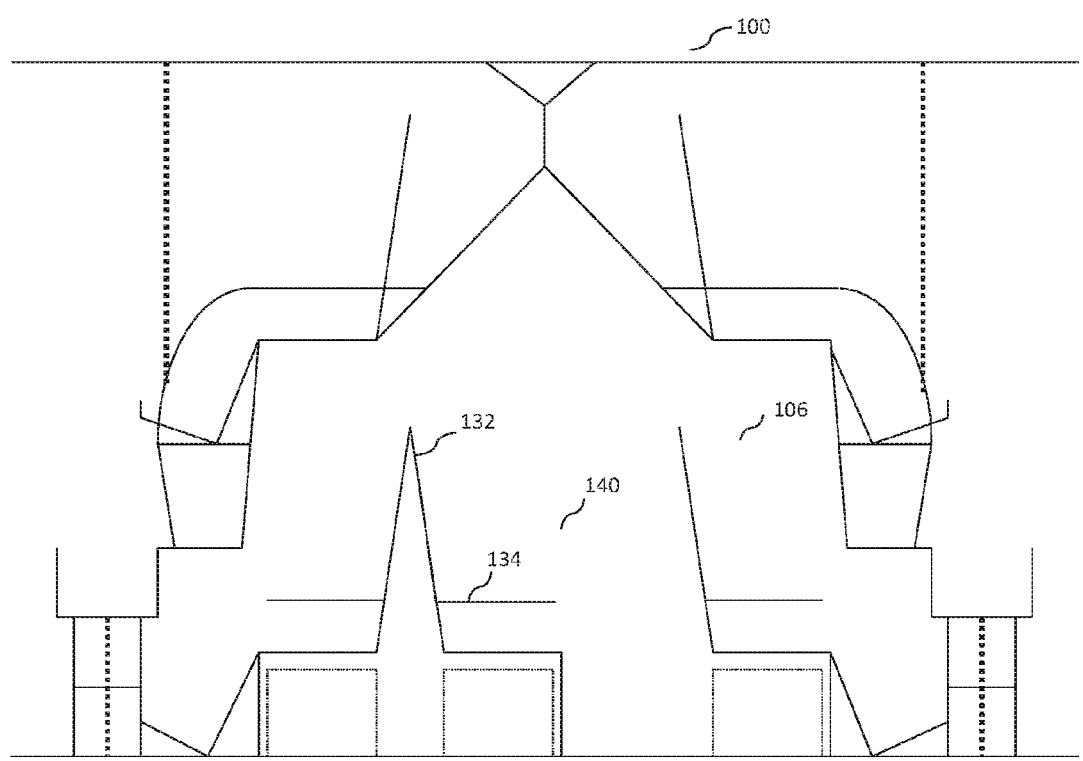
FIG. 4 shows the first embodiment with an access open space allowing a passenger in an interior seat of a bottom row to walk to the aisle, and with the access open space being behind an aisle seat of the bottom row, while seats are in a takeoff position.

FIG. 4 shows the first embodiment 100 with seats in a takeoff position and with an access open space 140 for the bottom interior seat 132 being behind an aisle seat 106. Note that FIG. 4 should be understood in a three dimensional manner. In this cross-sectional view, the bottom interior seat 132 should be seen as being further away (such as by the width of the aisle seat 106) from the plane of the sheet of paper, while the corresponding aisle seat 106 can be at the plane of the sheet of paper.

If a passenger in an interior seat 132 of a bottom row wants to walk to the aisle, the passenger can slide the interior seat 132 backward. Then the passenger can fold up one of the arm rests 134, switch him or herself from facing forward to facing the aisle, stand up and walk to the aisle through the access open space 140. The access open space 140 is behind the aisle seat 106 of the bottom row.

Figure 5:
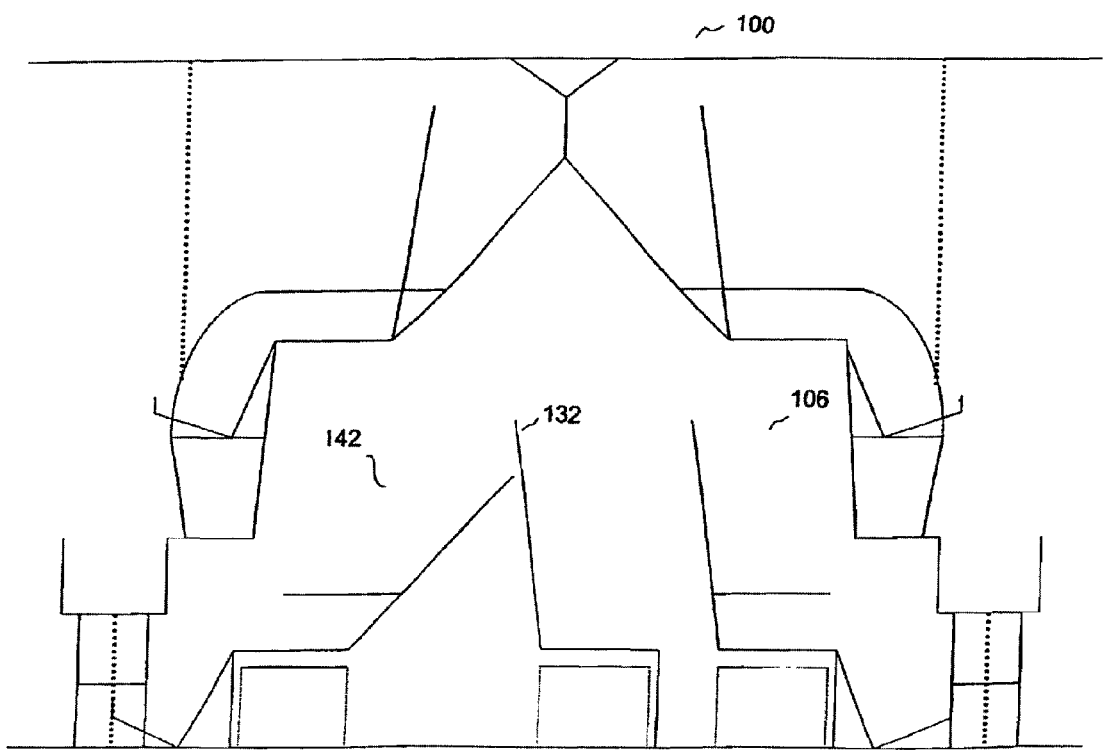
FIG. 5 shows the first embodiment with an access open space allowing a passenger in an interior seat of a bottom row to walk to the aisle, and with the access open space being behind an aisle seat of the bottom row, while aisle seats are in resting and takeoff positions.

FIG. 5 is similar to FIG. 4, except that one bottom row aisle seat 106 is in a takeoff position, and its neighboring bottom-row aisle seat 142 is in a resting position. The take-off position aisle seat 106 is in the same row as the interior seat 132 that has been moved backward. Unlike FIG. 5, in FIG. 6, both bottom row aisle seats, 142 and 106, are in their resting position. For the passenger in the interior seat 132 to get to the aisle, again the passenger can switch from facing forward to facing the aisle, stand up and walk to the aisle through the access open space 140. The access open space 140 is behind its neighboring bottom row aisle seat 106.

Figure 6:
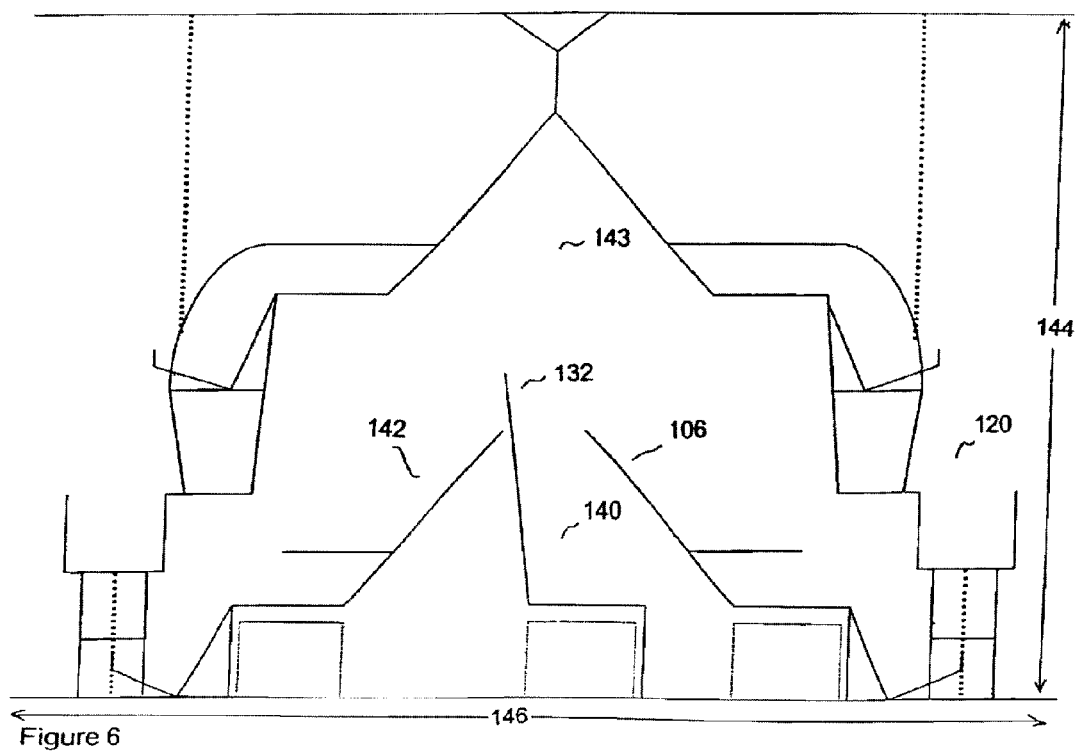
FIG. 6 shows the first embodiment with an access open space allowing a passenger in an interior seat of a bottom row to walk to the aisle, and with the access open space being behind an aisle seat of the bottom row, while aisle seats are in their resting position.
Figure 20A:
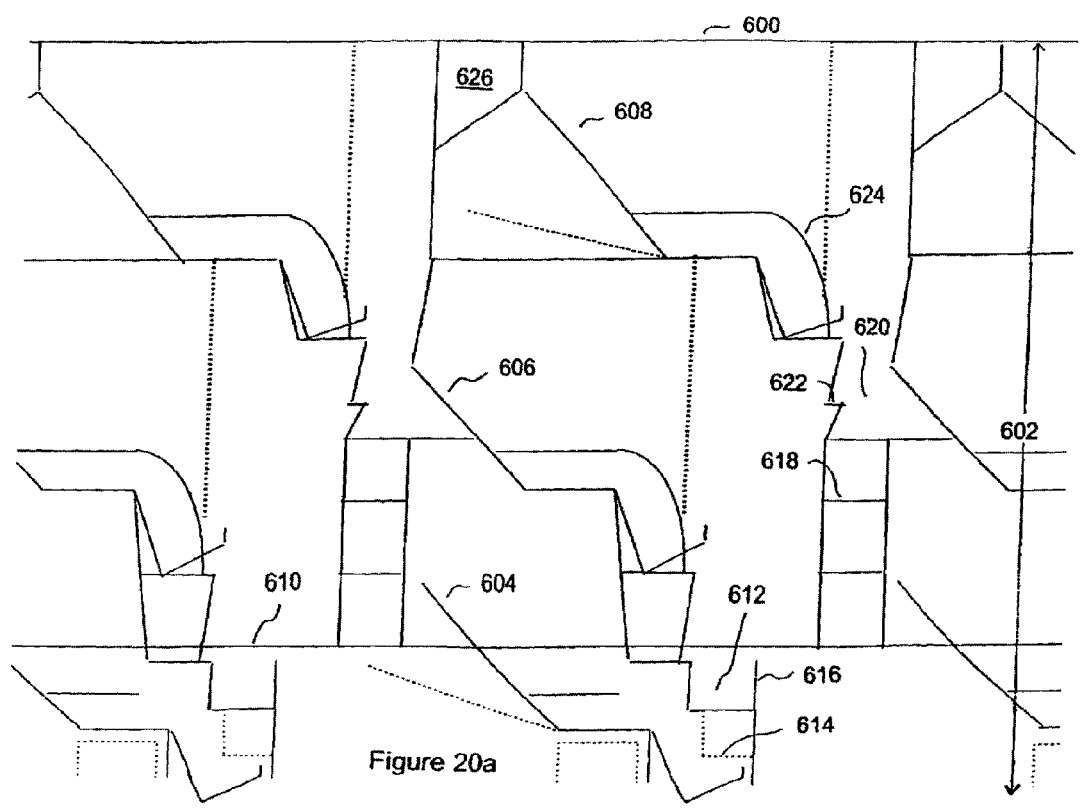
FIGS. 20a-b show a fifth embodiment of the present invention with three levels of seats.
Figure 20B:
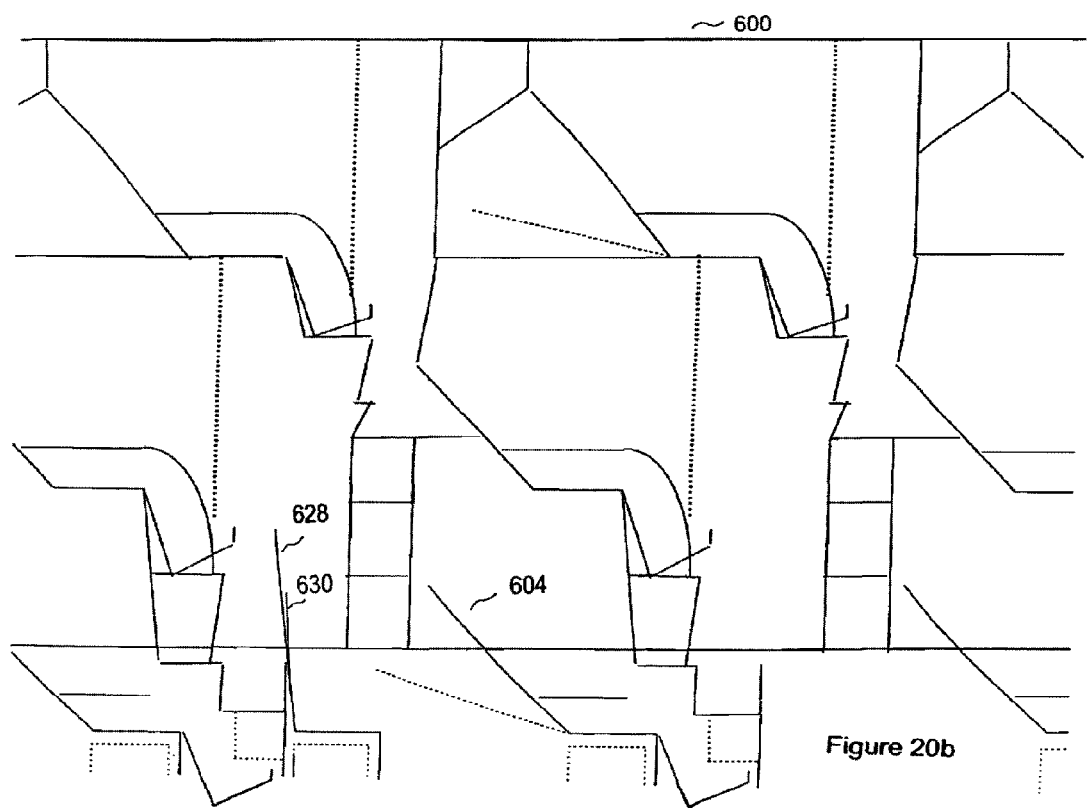

As shown in the FIGS. 4-6, there is an access open space 140 behind an aisle seat 106. By using the access open space 140, a passenger in the corresponding interior bottom seat 140 can walk to the aisle without requiring any passenger in the aisle seat 106 to stand up. Unlike existing coach seating arrangements, in the first embodiment, the interior seat passenger does not have to go over any passenger in the corresponding aisle seat, even if the aisle seat is in a resting position. Also, as shown in FIGS. 4-6, there is more head room 143 for the normal access open space 140 than the emergency access open space shown in FIG. 3, where seats are in their emergency exit position. To better illustrate the advantages of the present invention, dimensions of the fuselage of a Boeing 747 are used as an example. All the figures, except FIGS. 20a-b, are drawn approximately to scale, with the distance from the ceiling to the floor, such as the distance 144 in FIG. 6, being approximately 8 feet; and the width of the figures, such as the width 146 in FIG. 6, being approximately 12.8 feet. The first embodiment can fit into the existing fuselage of a Boeing 747, and does not require additional floor space or head room. However, compared to existing coach seats, the seats in the first embodiment are much more comfortable and can be much more easily accessed.

The following dimensions of the first embodiment are just one example for explaining the invention. Other dimensions are also possible.

Based on the inter-cabin height of 8', each seat can have the following dimensions: seat back is 32" long, seat length for the seat base is 17", and leg rest is 15" for the leg rest shown in FIG. 3. As compared to existing coach seats, the seat pitch (or the distance from the center of one seat to the center of its neighboring seat either in front or behind, such as between seats 106 and 108 of FIG. 2 can be doubled, e.g., increased from typically 31-34" to at least 58". This allows the seat back of each seat to be reclined to at least 35 degrees, compared to 20 degrees of existing coach seats. In another embodiment, the seat back of each seat can be reclined to at least 40 degrees.

The seating arrangements also have more leg room. This is partially because the leg rests of the bottom seats can use the bottom of the access open space for the top-row seats. For example, as shown in FIG. 2, the sole rest 117 of the leg rest 114 is using the bottom of the access open space 120 for the top-row seats. This allows the leg rests to be tilted by at least 10 degrees. In another embodiment, the leg rests can be tilted by 25 degrees, which can further increase resting comfort.

Based on the seating arrangements of the first embodiment, a passenger as tall as six feet four inches can recline comfortably in a resting position, and can walk to the aisle through an access open space upright, without stooping. For example, as shown in FIG. 6, both the access open space 120 for the top rows and the access open space 140 for the bottom row can allow a passenger as tall as six feet four inches to walk to the aisle without stooping, at least in the access open spaces.

Further, with the passengers in the interior seats walking to the aisle through access open spaces, the passengers do not have to walk over aisle passengers or do not have to ask aisle passengers to stand up in order to reach the aisle. Ingress and egress of the interior passengers are thus significantly facilitated, with minimal interference or disturbances to other passengers, such as the aisle passengers.

In one embodiment, an access open space is at least 6 feet high and can be 9 inches deep. If the pitch of the seats is reduced, or if the seats are made closer together, the access open space can even be deeper. The access open space is at least five feet six inches high and can be seven feet high. As to the width of the access open space, it can be the width of an aisle seat.

The seat width can also be increased. This is because the fuselage may only need one aisle or corridor, instead of two. For example, in existing economy class seating arrangement, a row of ten seats is typically divided as 3 by 4 by 3, which helps attendants to deliver food and beverages to passengers from the aisle(s). It may not be safe for them to extend their hands beyond more than two passengers, particularly when they are delivering food trays. In the first embodiment, the situation is different because the access open spaces allow flight attendants to walk in front or behind each passenger, whether they are aisle or interior passengers. For example, a flight attendant can walk in front of each passenger in the top row through the access open space 120, and can walk behind each passenger in the bottom row through the access open space 140.

Thus, seating arrangements for ten seats can be 5 by 5, with only one aisle in the middle. To illustrate, let's compare the seat width of the first embodiment to existing economy class seats:

For 747, with
the inter-cabin width of 20 feet,
ten seats in a row and each seat having 3" arm rests, and
two aisles and each aisle being 19" wide,
the width of each existing seat=(240−19*2−3*10)/10=17.2"

For the first embodiment, there can be, for example, three different scenarios.

In the first scenario, again there are two aisles. All ten seats are together, with one aisle on each side. Then the width of each seat=(240−19*2−3*10)/10=17.2"

In the second scenario, there is only one aisle approximately in the middle. There are 11 seats in the bottom row and 9 seats in the top row. One reason that there can be more seats in the bottom row than in the top row is because the fuselage is round. With the bottom row approximately positioned along the center of the fuselage, the top row has less room. Let's assume that due to the round shape, 14" on each side of the top row cannot be used.

In this case, for the top row,
the width of each top row seat=(240−19−3*9−14*2)/9=18.4"
For the bottom row,
the width of each bottom row seat=(240−19−3*11)/11=17.1"

In the third scenario, there is only 1 aisle on one side, and there are ten seats on the top and ten on the bottom. Again for the top row, 14" is reserved on the side opposite to the aisle as not to be used.

In this case, for the top row,
the width of each top row seat=(240−19−3*10−14)/10=17.7"
For the bottom row,
the width of each bottom row seat=(240−19−3*10)/10=19.1"

Thus, for the above examples, the seat width of the first embodiment can be 17.1" to 19.1" wide, as compared to the existing economy seat width of 17.2", while maintaining the same number of seats in the cabin. Thus, in most scenario, the seat width is wider than the existing economy seat width.

Also, as illustrated in second scenario, there can be more bottom seats than top seats or vice versa, because the fuselage is usually not in a square shape, but is typically round. If the bottom seats are close to the center line of the fuselage, there can be more bottom seats than top seats, such as 9 top seats and 11 bottom seats.

In the above examples, a row can have ten contiguous seats. Under such conditions, the seat next to an aisle can still be an aisle seat. All of the other seats not next to an aisle would be interior seats. For example, if a row has three seats with one being a window seat and another being an aisle seat, there would be two interior seats, with one of them being the window seat. In this example, for the window seat passenger to get to the aisle, the passenger can move the seat backwards and walk behind the non-window interior seat and the aisle seat to reach the aisle. The access open space in this situation can be behind the aisle seat. One can define an access open corridor as including the access open space and a space behind the non-window interior seat, which can be similar in size to the access open space. Then, for the window seat passenger to get to the aisle, the window seat passenger walks through the access open corridor.

Another issue is regarding luggage space. The first embodiment has not compromised the amount of available luggage space. Referring back to FIG. 1, the luggage spaces for the top seats can be the space below the leg rests, such as the space 200 below the leg rests of the top seat 104. Current luggage space for each customer is 9" by 14" by 22". As shown in FIG. 1, the space 200 is trapezoidal in shape. If one just takes the shorter width of the trapezoid, the luggage space 200 below the leg rests is about 9.6" by 14.4" by 20". The 20" here is only for one leg rest, but the spaces for the leg rests for seats in the same row do not have to be blocked. The luggage spaces for seats in a row can be continuous. So, the amount of reduction is minimal. In addition, the trapezoidal shape further increases the luggage space. As shown in FIG. 1, the first embodiment 100 includes a step to help a passenger to walk up to the top seats, such as the step 202 for the top seat 104. The luggage space being trapezoidal in shape would maintain the step 202 for ease of access to the top seat 104, while increasing the luggage space 200.

As to the luggage space for the bottom seats, again referring back to FIG. 1, the luggage spaces are below the seat bases, such as the luggage space 204 for the bottom seat 108. As shown in the figure, the bottom seat luggage space 204 has a bigger volume than that available for the top seat luggage space 200.

There can be a door for each luggage space. For example, for a luggage space 206 of the top seat 102, the hinge 208 of the door 210 can be at the step 212 to go to the top seat 102. Anyway, the door 210 can be opened by removing a latch and then pulling it down relative to the hinge 208.

In one embodiment, to improve privacy, there can be partitions between the seats. Since passengers in neighboring top rows of seats can be facing each other, it might be better to have partitions between them particularly for long trips. For example, between the top aisle seats 102 and 104, there is at least one partition 214. In another embodiment, there can be two partitions, 214 and 216. The partition can be a piece of cloth, plastic, etc. The partition can be retractable, such as can be raised during landing and takeoff of the plane. In one embodiment, the partition is also made of materials that are fire-resistant. There can also be partitions between the leg rests of the bottom rows, again for privacy reasons, such as the partition 218 between the leg rests 114 and 115. This bottom partition 218 can be a fixed board.

In one embodiment, to further improve on privacy, there can be additional partitions between seats on the same row. The partitions can be above the arm rests.

Regarding electronics for the passengers, in one embodiment, one of the arm rests for the top seats can include an electronic console. A flat panel display can be stored inside the console and can be taken out of the console. Such electronic implementation can be found in some of the existing airplane seats, and will not be further discussed.

As to each of the bottom seats, in one embodiment, there can be a flat panel display on the wall in front of the seat, such as the wall 250 in front of the bottom seat 106, as shown in FIG. 2. Signals, such as broadband signals, can be channeled to the panel through a small pipe from the floor. Next to the display, there can be a number of indicators, such as for calling a flight attendant and turning on lights. Each of the bottom seats can include a remote control to wirelessly transmit control signals for activating the corresponding electronics, such as the display and the indicators. The remote control can be at an arm rest of the seat, such as the arm rest 116 of the bottom seat 106. The wireless signals can be based on infrared or ultrasound technologies. There can also be a female stereo connector next to each display to receive a headset male plug of a headset for a passenger.

As to the locations of overhead light sources and oxygen masks, in one embodiment, they can be from the ceiling for top row passengers, such as the ceiling 252 of the top seat 102. As for the bottom seat passengers, they can be located in chambers located below the seat bases of their corresponding top row seats, such as below the seat base 254 of the top seat 102 for the bottom seat 106.

To improve on safety, in one embodiment, there can be air bags at difference places. For example, there can be an air bag in front of each of the bottom seats, such as on the wall 250 in front of the bottom seat 106. If there is a display on the wall, the airbag can be around the display. There can also be air bags that can be dropped and hung from the ceiling down between passengers in the top row seats, such as the ceiling 252 for passengers in the top-row aisle seats, 102 and 104.

To increase the ease of getting into top row seats, in one embodiment, there are rails for each top row seat, such as the rail 260 for the top row seat 102. A rail can terminate at an arm rest, such as the rail 260 terminating at the arm rest 262 of the top row seat 102. In one embodiment, a step, as previously explained, also can be present for each top row seat, such as the step 202 for the top row seat 104.

Figure 7:
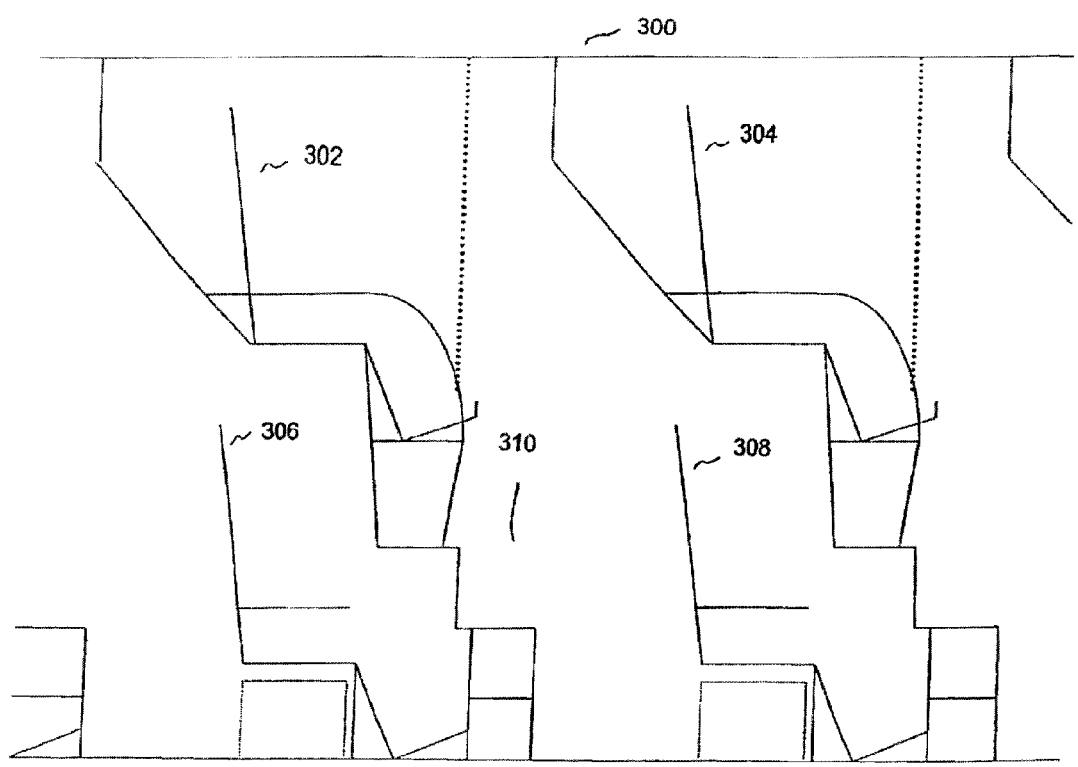
FIG. 7 shows a second embodiment of the present invention with seats in a takeoff position.

FIG. 7 shows a second embodiment 300 of the present invention. In this embodiment, all the seats are in the same orientation. For example, the two top seats, 302 and 304, and the two bottom seats, 306 and 308, are all in the same orientation, such as facing forward. In FIG. 7, the seats are in their takeoff position. Again, only aisle seats are shown. The seats can be similar to the seats in the first embodiment, with the bottom interior seats slidably mounted on a floor.

For a passenger in an interior seat of a top row to walk to an aisle, the passenger can walk to the aisle through an access open space, which again is in front of the top row aisle seat. For example, the top row interior seat (not shown in the figure) next to the top row aisle seat 302 has an access open space 310 in front of the aisle seat 302.

Figure 8:
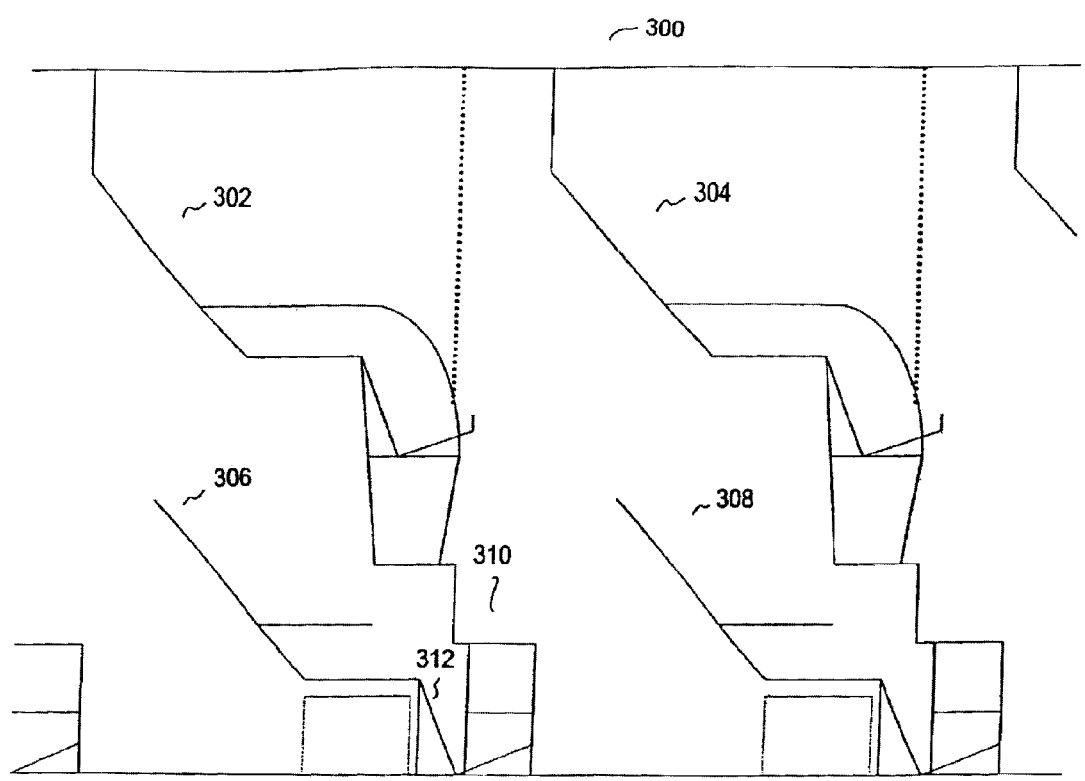
FIG. 8 shows the second embodiment with seats in their resting position.

FIG. 8 shows the second embodiment 300 with seats in their resting position. Again the leg rests of bottom seats extend into the bottom of access open spaces of top row seats, such as the leg rest 312 of the bottom aisle seat 306 extends into the bottom of the access open space of top row seats.

Figure 9:
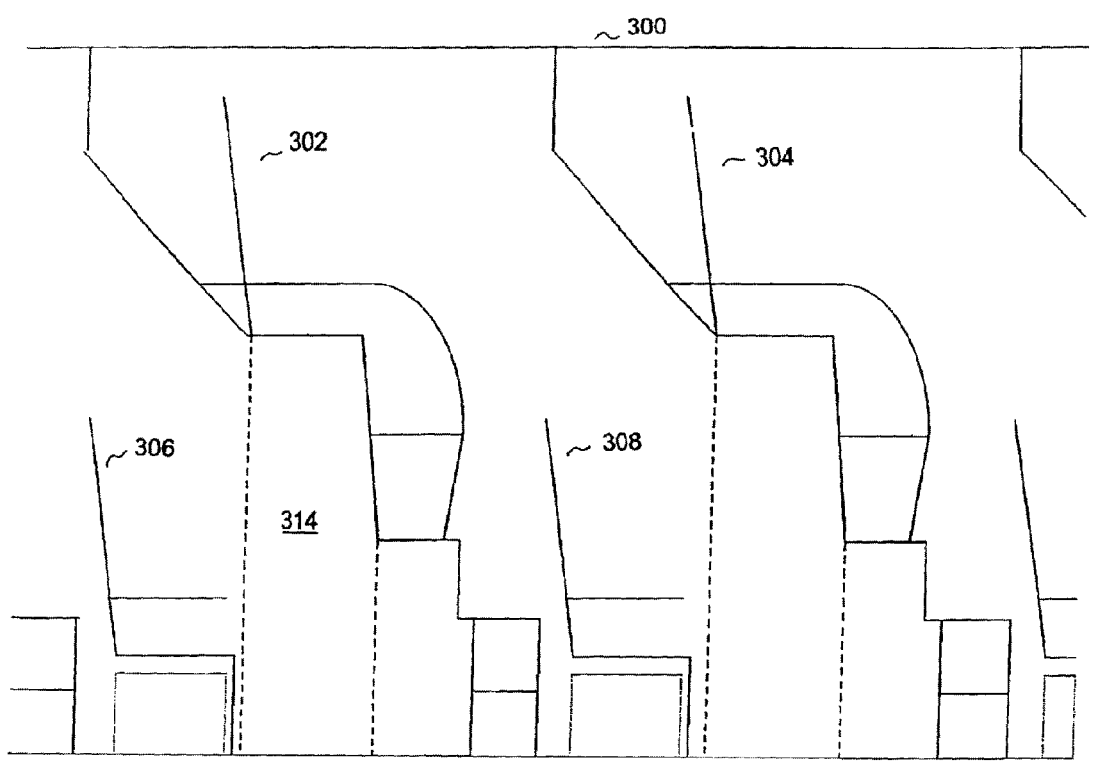
FIG. 9 shows the second embodiment with seats in an emergency exit position and with emergency access open spaces for bottom seats being in front of seats.

FIG. 9 shows the second embodiment 300 with seats in an emergency exit position and with emergency access open spaces for bottom seats being in front of the seats. For example, the emergency access open space 314 for the bottom seat 306 is in front of the seat 306.

Figure 10:
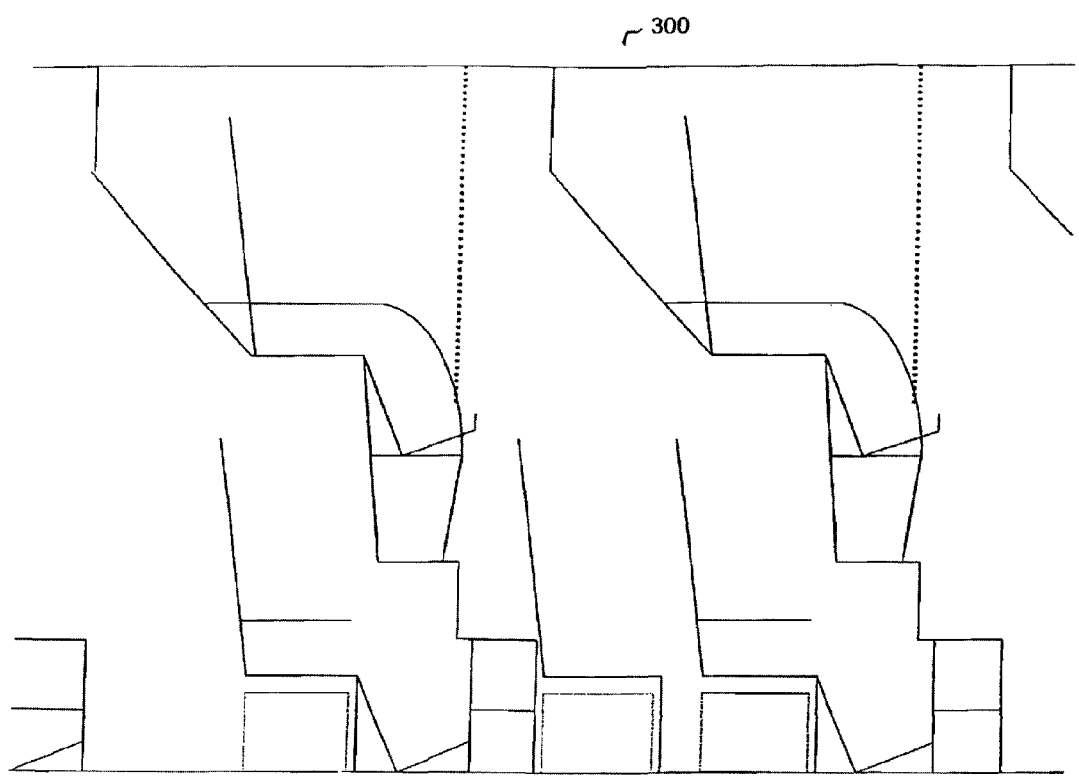
FIG. 10 shows the second embodiment with an access open space allowing a passenger in an interior seat of a bottom row to walk to the aisle, and with the access open space being behind an aisle seat of the bottom row, while seats are in a takeoff position.
Figure 11:
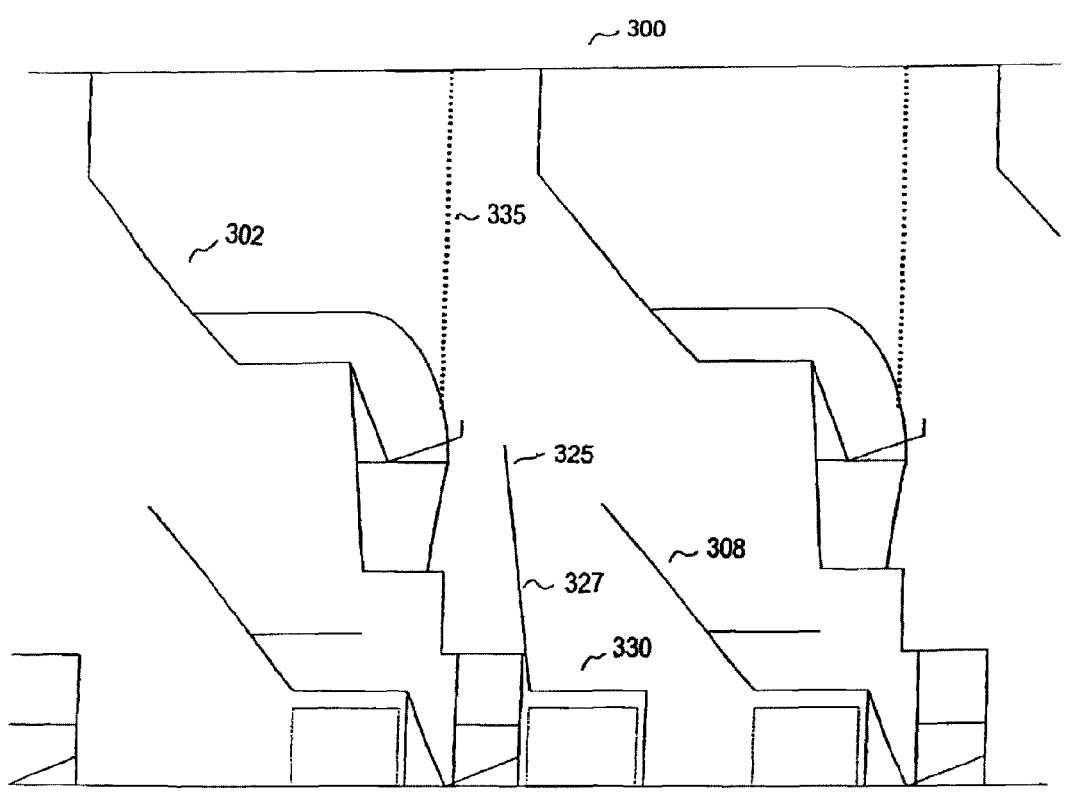
FIG. 11 shows the second embodiment, with an access open space allowing a passenger in an interior seat of a bottom row to walk to the aisle, and with the access open space being behind an aisle seat of the first bottom row, while aisle seats of the bottom rows are in their resting position.

FIG. 10 shows the second embodiment 300 with seats in their takeoff position and with an access open space allowing a passenger in an interior seat of a bottom row to walk to the aisle. In this example, the access open space can be behind an aisle seat of the bottom row. FIG. 11 is similar to FIG. 10, except that the bottom aisle seats are in their resting position.

For the second embodiment 300 as shown in FIG. 11, the access open spaces for the bottom row seats can be accessed in a similar way as in the first embodiment. If a passenger in an interior seat 327 of a bottom row wants to walk to the aisle, the passenger can slide the interior seat 327 backward. Then the passenger can fold up one of the arm rests 327 and walk to the aisle through the access open space 330 that is behind the aisle seat 308 of the bottom row.

As to overhead light and oxygen masks, again they can be similar to the first embodiment. Similarly, the locations and activation methods of electronics in the second embodiment can be similar to those in the first embodiment.

For privacy reasons, there can be a partition in front of each of the top row passengers, such as the partition 335 of the top row seat 302. This would prevent a bottom passenger from looking up and seeing a passenger in a top row seat, such as the passenger in the bottom row seat 308 from seeing the passenger in the top row seat 302.

Figure 12:
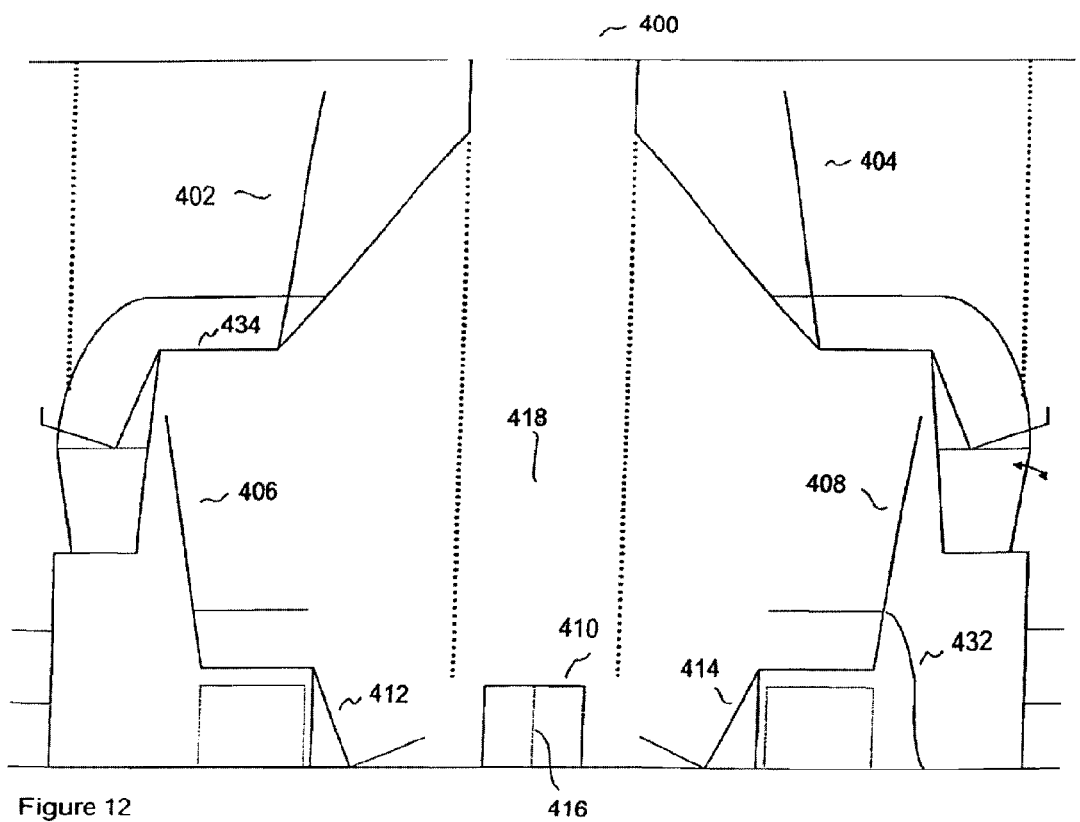
FIG. 12 shows a third embodiment of the present invention with seats in a takeoff position.

FIG. 12 shows a third embodiment 400 of the present invention. The seats are in their take off position. Compared to the seat pitch of the first and the second embodiments, the seat pitch in this embodiment is increased, such as to 80". This seat pitch can be similar to the seat pitch of many existing first class seats. However, because there are two levels—the top rows and the bottom rows—the number of seats in this embodiment can be twice as many for the same space.

In the third embodiment 400, the orientation of both the top row and the bottom row seats can be similar to the first embodiment. Also, the design of the top rows in this embodiment 400 can be similar to the design of the top rows in the first embodiment 100. As to the bottom rows, they can be similar to the first embodiment. However, the top row seats closest to their corresponding bottom row seats differ in orientation. For example, the top row seat 402 differs in orientation to the bottom row seat 406, in comparison to the top row seat 102 being similar in orientation to the bottom row seat 106 in the first embodiment 100. To prevent the legs of a bottom row passenger from interfering with the legs of its neighboring bottom row passenger, a housing is created to receive at least a portion of the leg rests from both passengers. For example, a housing 410 can be used to receive at least a portion of the leg rests 412 and 414 of the bottom seats 406 and 408. The housing 410 can have a fixed partition 416 in the middle.

In the third embodiment 400, the access open spaces are in front of the seats, both for the top and the bottom rows. The configuration of the access open spaces for the top row seats is similar to those of the first embodiment 100. As to the bottom row seats, if a passenger in an interior seat of a bottom row would like to walk to the aisle, the passenger can walk to the aisle through an access open space that is in front of the corresponding aisle seat. The access open space of the bottom row seats can also be on top of the housing for the leg rests. For example, a passenger in an interior seat (not shown in the figure) next to the aisle seat 406 wants to walk to the aisle. The passenger can stand up and walk on the housing 410 through an access open space 418 in front of the aisle seat 406 to get to the aisle.

Figure 13:
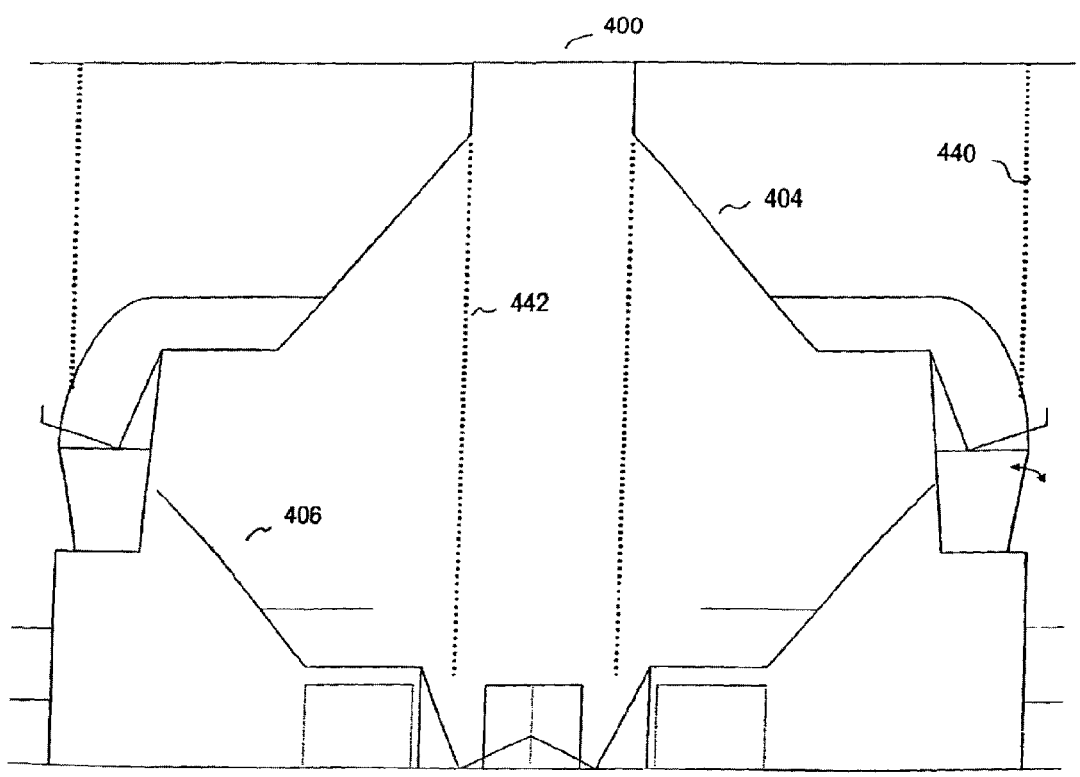
FIG. 13 shows the third embodiment with seats in their resting position.

FIG. 13 shows the third embodiment 400 with seats in their resting position.

Figure 14:
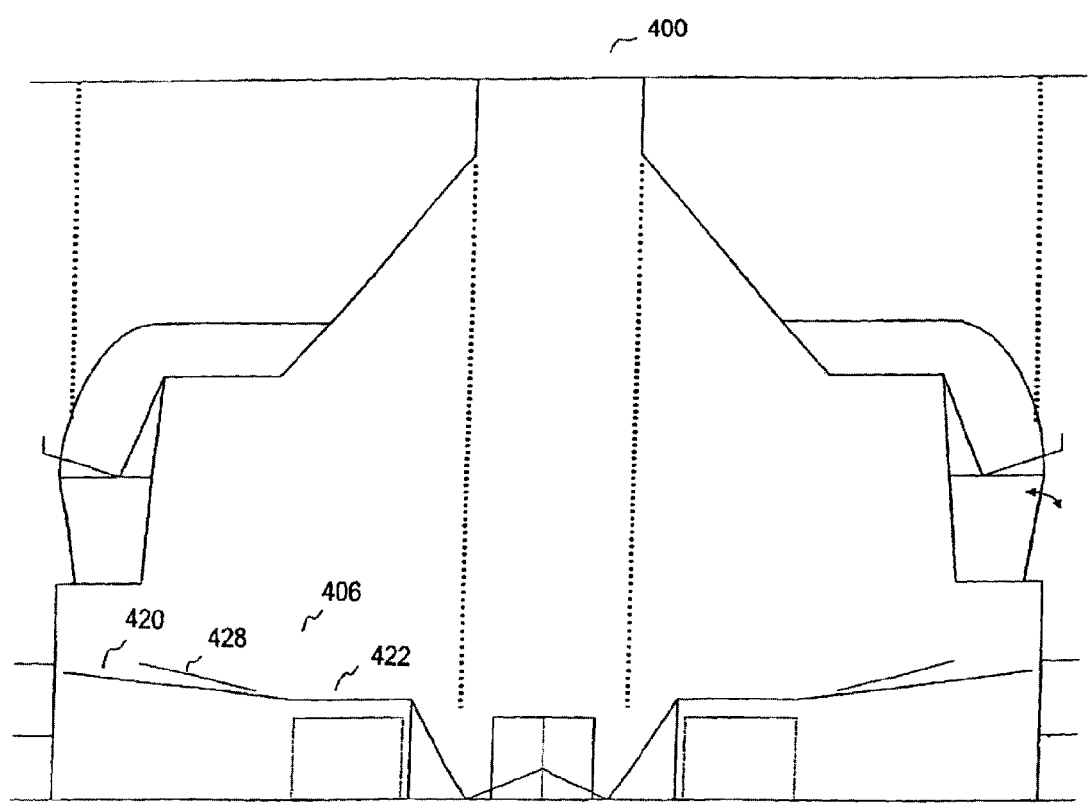
FIG. 14 shows the third embodiment with the seat backs of bottom seats substantially horizontal relative to their seat bases.

FIG. 14 shows the third embodiment 400 with the seat backs of bottom seats substantially horizontal relative to their seat bases. For example, the seat back 420 of the bottom row seat 406 is substantially horizontal relative to the seat base 422 of the seat 406. The arm rests 428 of the seat 406 is also folded towards the seat back 420. To achieve the substantially horizontal resting position, in one approach, the passenger first moves the seat forward to allow room for unfolding the seat back down to the almost horizontal resting position. Then the passenger can move the seat backward so as to have more room in front.

Figure 15:
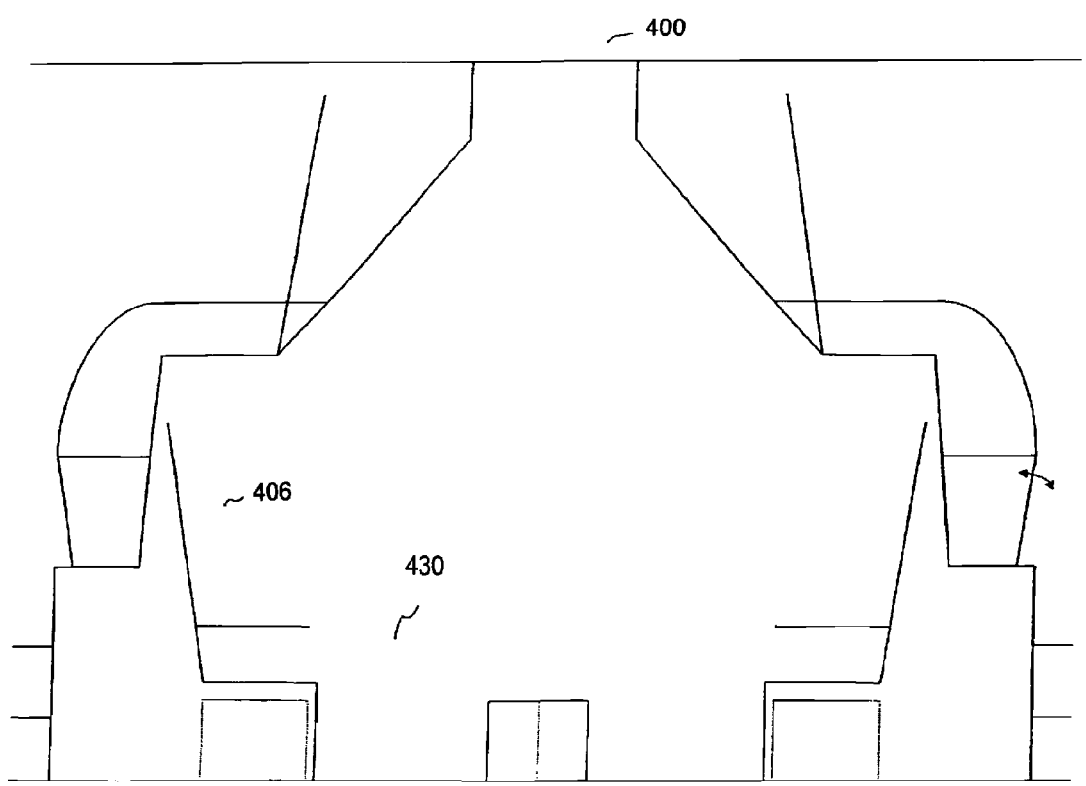
FIG. 15 shows the third embodiment with seats in an emergency exit position and with emergency access open spaces for bottom seats being in front of the seats.

FIG. 15 shows the third embodiment 400 with seats in their emergency exit position. In this example, the emergency access open spaces for the bottom interior seats are again in front of their corresponding bottom aisle seats, such as the access open space 430 in front of the bottom aisle seat 406.

Regarding the locations and controls of the electronics for the passengers, for the top seats of the third embodiment 400, they can be similar to those of the top seats of the first embodiment 100. For the bottom seats of the third embodiment, they can be similar to their top seats, such as the arm rests for the bottom seats can include an electronic console to store a flat panel display as in the top seats. However, broadband signals can be channeled to the display of the bottom seats through a cable at the back of the bottom seats. For example, referring to FIG. 12, such a cable 432 is shown behind a bottom seat 408.

As to the locations of overhead light sources and oxygen masks, they can be similar to the first embodiment. For example, the light sources and oxygen masks for the bottom seat 406 is below the seat base 434 of the top row seat 402.

For privacy reasons, there can be partitions between bottom rows of seats and between top rows of seats. For example, as shown in FIG. 13, there can be a partition 440 in front of the top row seat 404, and a partition 442 in front of the bottom row seat 406. As shown in FIG. 15, the partitions can be raised during emergency exit conditions, or during the time of the flight landing and takeoff.

Figure 16:
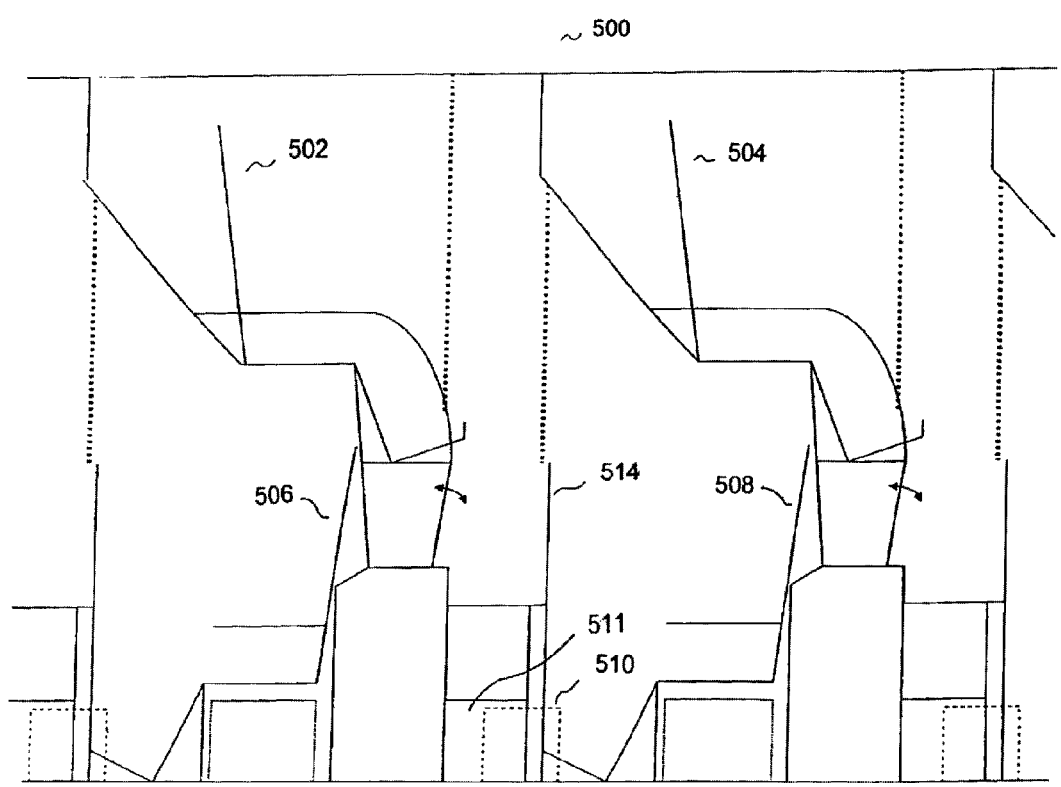
FIG. 16 shows a fourth embodiment of the present invention with seats in a takeoff position.

FIG. 16 shows a fourth embodiment 500 of the present invention. Again, there are two top row seats 502 and 504, and two bottom row seats 506 and 508. However, the seats shown in FIG. 16 are interior seats and they are in their takeoff position. In this embodiment, the top row seats can be similar to the top row seats in the first embodiment 100, and the bottom row seats can be similar to the bottom row seats in the third embodiment 300. However, the seat pitch of the fourth embodiment is similar to the seat pitch of the first embodiment. Also, the access open spaces for the top row seats also serve as the access open spaces for the bottom row seats.

As one embodiment, assume that a passenger in an interior bottom row seat wants to walk to an aisle. The passenger can pull out a pedestal or a step stored in front, such as below an access open space of a top row seat, or in the space for a leg rest, such as the space 511. The pedestal does not have to be a solid piece. It can include a board with two stands on its sides. In other words, a leg rest can go inside a pedestal. In another embodiment, a pedestal can be a foldable plate that can be folded up and stored in the space for leg rest, when not in use. In any event, after pulling out the pedestal, the passenger can step onto the pedestal. Open a gate and walk through an access open space of the top row to get to an aisle. For example, as shown in FIG. 16, a passenger in the bottom row interior seat 508 can pull out a pedestal 510, step onto the pedestal 510, open a gate 514 and walk through an access open space to the aisle.

Figure 17A:
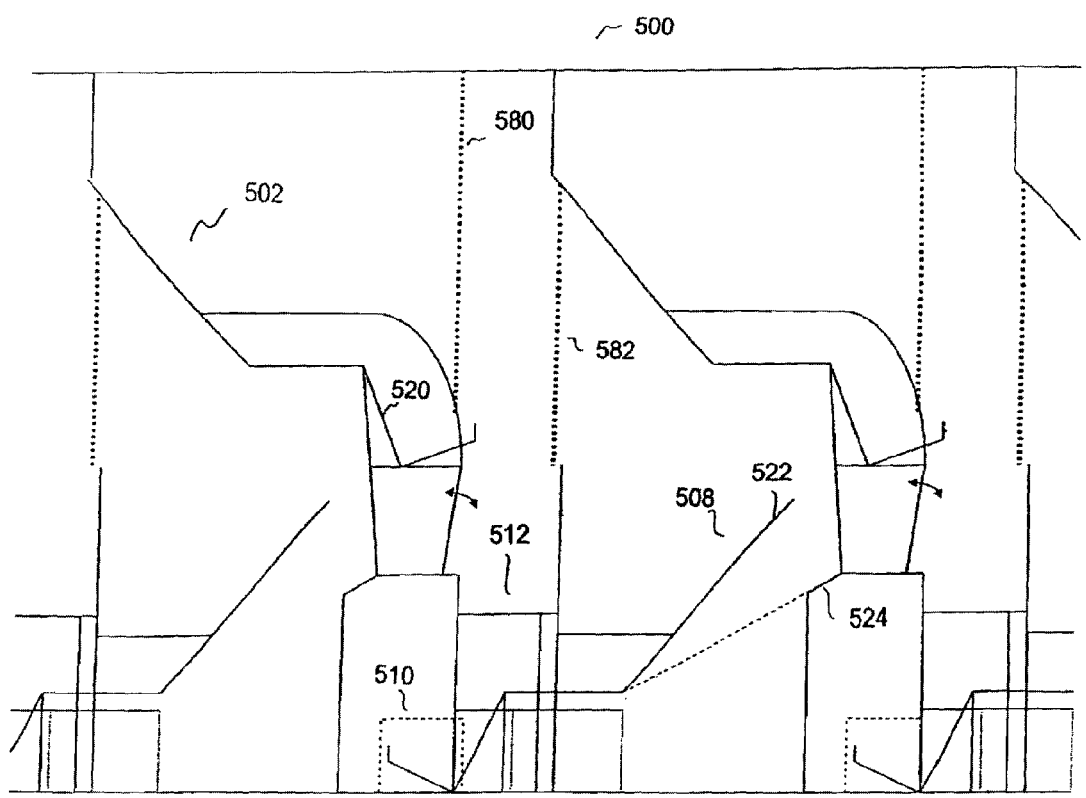
FIGS. 17a-b show different versions of the fourth embodiment with seats in their resting position, where an access open space for accessing an interior seat in a bottom row being the same access open space for an interior seat in a top row.

FIG. 17a shows the fourth embodiment 500 with seats in their resting position. To better utilize space, a portion of the leg rest of a bottom row seat extends below an access open corridor 512 of its neighboring top row and further extends below the leg rest 520 of its neighboring top row seat 502. In this example, the access open corridor 512 leads to the access open space (not shown in the figure). The access open corridor 512 includes the space in front of the top row interior seat 502.

As shown in FIG. 17a, the seat back of a bottom row set can be further reclined to rest on a support plane. For example, the seat back 522 of the bottom row seat 508 can be further reclined to rest on a support plane 524.

Figure 17B:
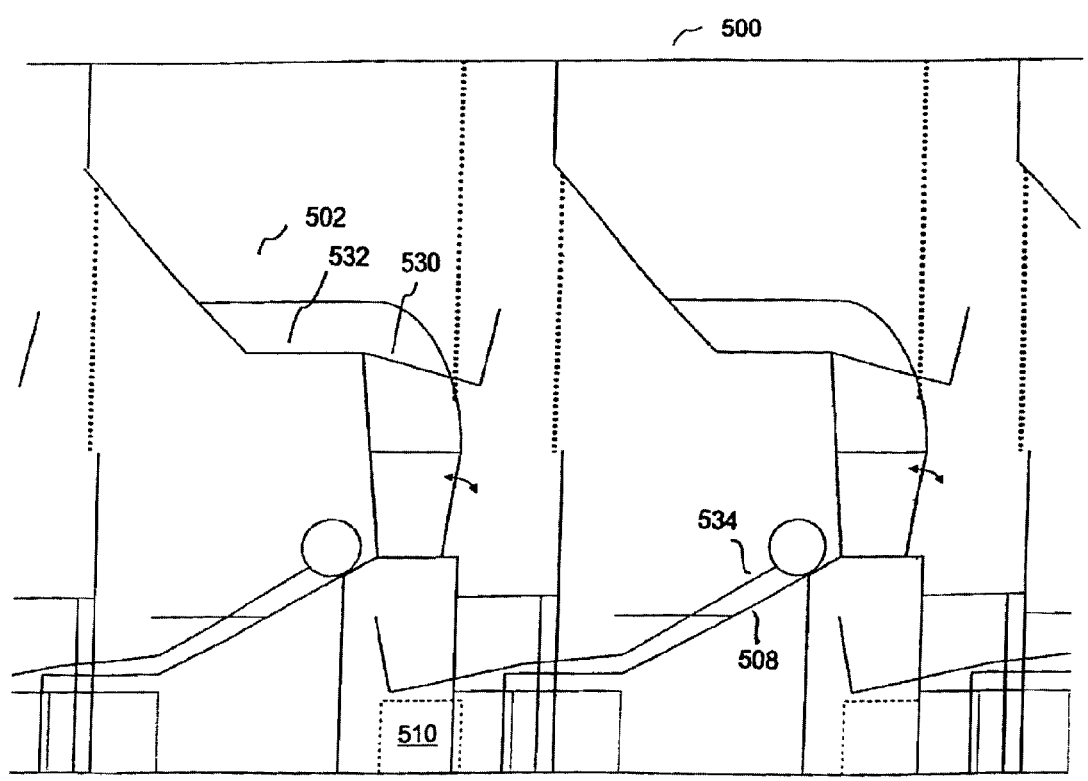

FIG. 17b shows another version of the fourth embodiment 500 with seats in their resting positions, leg rests in a more reclined positions and a person resting on each of the bottom row seats. For example, the leg rest 530 of the top row seat 502 is substantially horizontal relative to the seat base 532 of the seat 502. Also, a person 534 is resting on the bottom row seat 508, and the feet of the person 534 is on the pedestal 510. In one embodiment, the pedestal 510 can also be slidably mounted on a floor, the same floor the bottom seats being slidably mounted on.

Figure 18:
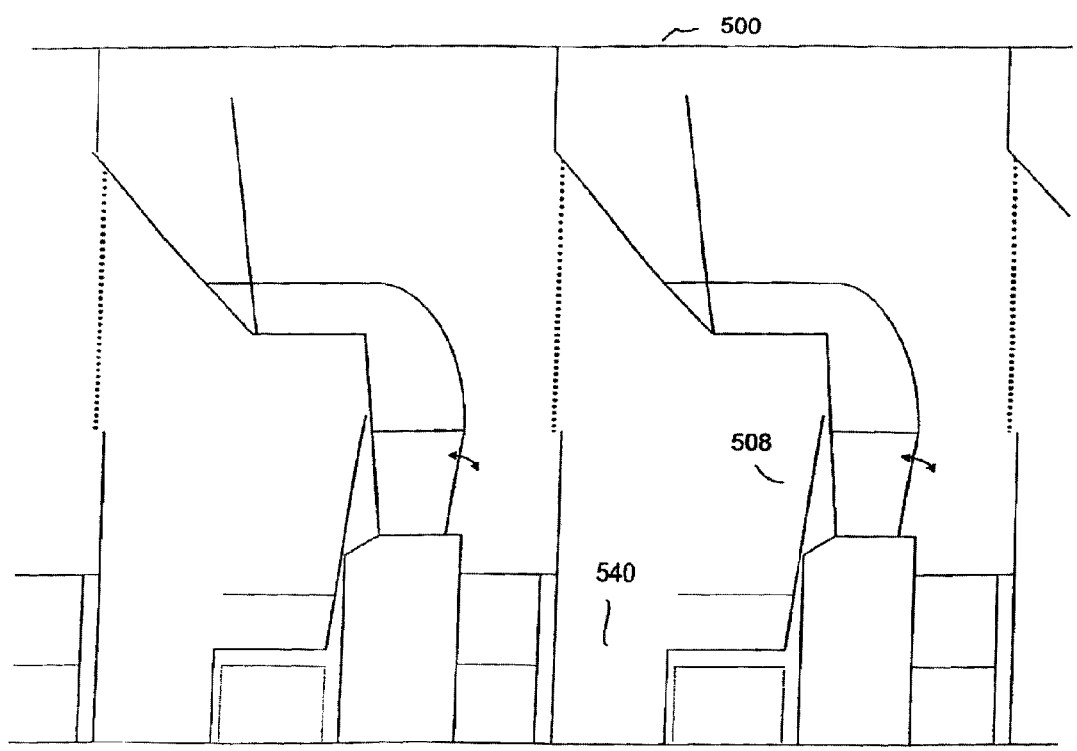
FIG. 18 shows the fourth embodiment with seats in an emergency exit position and with emergency access open spaces for bottom seats being in front of seats.

FIG. 18 shows the fourth embodiment with seats in their emergency exit position. Emergency access open spaces for bottom seats can be in front of the seats. As an example, for the bottom row seat 508, the emergency access open space 540 is in front of the seat 508.

Figure 19:
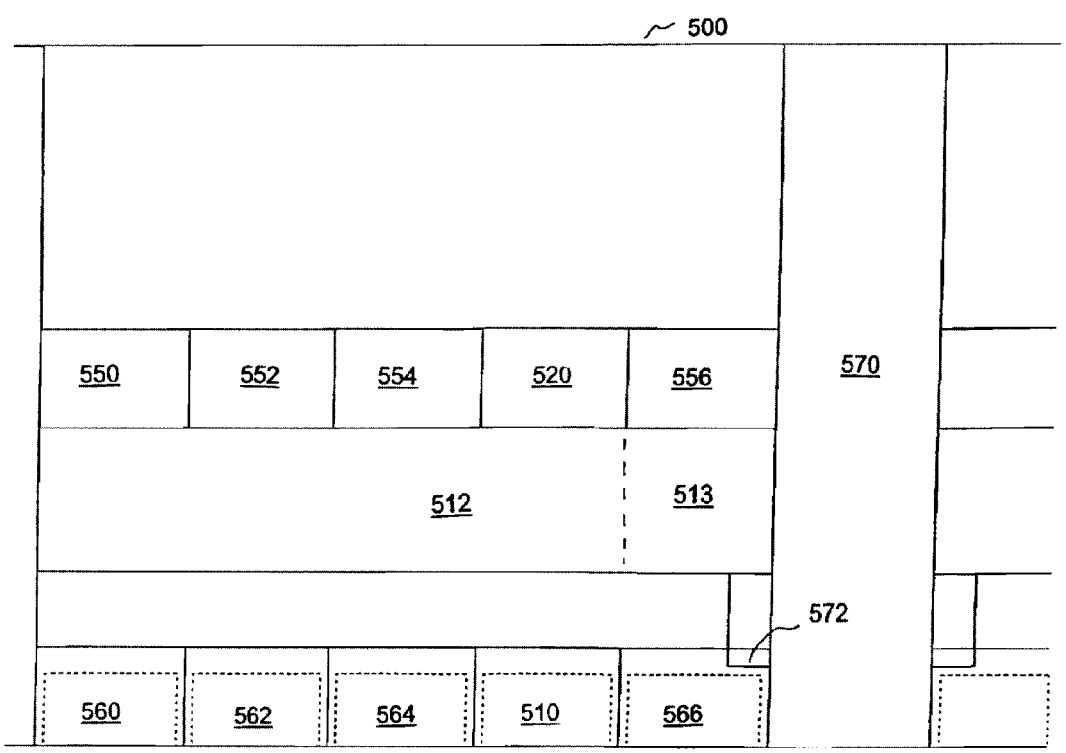
FIG. 19 shows a cross-sectional view of the fourth embodiment.

FIG. 19 shows a cross-sectional view of the fourth embodiment 500. To clarify the invention, the figure removes many structures. Some of the features shown in the figure include:
- the leg rests of five top row seats, 550, 552, 554 and 556, with the leg rest 520 of the interior top seat shown in FIG. 17a;
- the access open corridor 512 leading to the access open space 513;
- five pedestals, 560, 562, 564 and 566, with the pedestal 510 of the interior bottom seat shown in FIG. 17a to go up to the corridor 512 from bottom row seats to the aisle 570; and
- a step 572 to go up to the access open space 513 from the aisle 570.

In the fourth embodiment, regarding privacy, there can be partitions in front of each seat. For example, as shown in FIG. 17a, the partition 580 can be for the top-row interior seat 502; and the partition 582 can be for the bottom-row interior seat 508.

Regarding locations and controls of electronics, and the locations of the overhead light sources and oxygen masks for the seats, for the top seats, they can be similar to the top seats in the first embodiment 100. As to the bottom seats, they can be similar to the bottom seats in the third embodiment 400.

A number of embodiments have been described with at least two levels of seats, a top level and a bottom level. However, the invention can be extended to more than two levels of seats.

FIGS. 20a-b show a fifth embodiment 600 of the invention with more than two levels of seats. In this example, there are three levels of seats, such as the first level 604, the second level 606 and the third level 608. In this example, the second level is the level of an aisle the passengers would like to access. Again, the figures show aisle seats, and each seat can have an interior seat next to it.

In the fifth embodiment, the first level seats, such as the seat 604, can be similar to the bottom row seats of the second embodiment. However, the seat backs of the first level seats can be further reclined than the bottom row seats of the second embodiment. One reason the seat backs can be further reclined is that the seat pitch in the fifth embodiment can be longer since there are three levels. One can maintain the same number of seats with an increased pitch length because there are three, not two, levels of seats. Another difference is that the first level is below the level 610 of the aisle. To access the first level, one can first walk onto a second level access open corridor, such as the corridor 612. To help walking onto the first level, there can be an additional step 614. The additional step 614 can be not at the plane of the aisle, but further inside. Also, there can be a gate, such as the gate 616, for a person to open before the person steps into the first level.

In the fifth embodiment, the second level seats, such as the seat 606, can be similar to the top row seats of the second embodiment.

As to the third level seats, such as the seat 608, one approach to access them from the aisle is through a number of steps at the aisle, such as the steps 618. A passenger can walk from the aisle, at the aisle level 610. Then, the passenger walks up the steps, such as the steps 618, to a third level access open corridor, such as the access open corridor 620. To get onto a third level seat, such as the third level seat 608, the passenger can walk onto a step, such as the step 622. Then, with the help of a hand rail, such as the hand rail 624, the passenger can get to the third level seat.

In one embodiment, the third level seats are similar to the second level seats. However, as shown in FIG. 20a, the third level seats can be further reclined relative to the second level seats. Also, the luggage space for the third level seats can be above the seats, such as in location 626.

FIG. 20b shows one approach for an interior passenger in the first level to get to the aisle. In one embodiment, the approach is similar to the approach of the second embodiment. A passenger in an interior seat, such as the interior seat 628, slides the interior seat 628 backwards, lifts up the arm rest 630, changes its orientation from facing forward to facing the aisle, and walks behind the first-level aisle seat 604, through an access open space, to the aisle. In one embodiment, to reserve more space for the interior passenger to get to the aisle, the seat back of the first-level seats may not be able to recline as much as the seat back of the third-level seats.

FIGS. 20a-b are also drawn approximately to scale, except that the distance from the ceiling to the floor, such as the distance 602 in FIG. 20a, is approximately 11.6 feet. Though more than eight feet, such height is applicable to many planes. For example, the business class of Boeing 747 already has two levels, and the total height of the two levels is 16'7". Also, in this example, the seat pitch is 90". The first and the third level seats can be reclined to about 75 degrees.

A number of embodiments regarding seating arrangements have been described with specific dimensions provided based on seats in aircrafts, particularly Boeing 747. However, the present invention is applicable to other dimensions, other vehicles and stationary environment, such as trains, buses, vans or boats, seats in public waiting areas or home furniture, or in spaces that are valuable or where using such spaces is not free. Different embodiments of the invented seating arrangements provide greater seating and resting comfort, easy access and can also increase seating capacity.

Regarding toilets in an area with a multi-level seating arrangement, in one embodiment, one or more toilets are located in the area previously occupied by lower-level seats, instead of in a separate area. In other words, there can be, for example, upper-level seats above the toilet(s).

Regarding storage areas for the company providing a transportation service based on multi-level seats, in one embodiment, the storage areas can be located in the area previously occupied by lower-level seats. For example, storage areas for the airline itself are in the areas previously occupied by lower-level seats. There can be upper-level seats above the storage areas.

Figure 21:
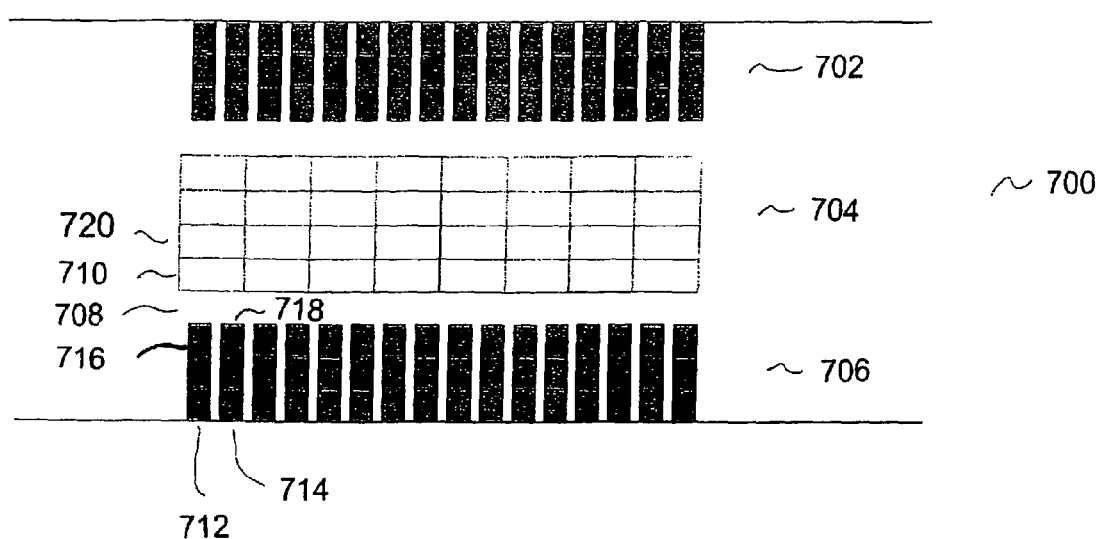
FIG. 21 shows a mixed-seating arrangement according to one embodiment of the present invention.

A number of embodiments regarding multi-level seating arrangements have been described. In one embodiment, there is a mixed-seating arrangement, with multi-level seats adjacent to single-level seats. FIG. 21 shows a mixed-seating arrangement 700 according to one embodiment. The mixed-seating arrangement 700 can be within a transportation vehicle, such as a plane, a bus or a train. In this embodiment, within the same cabin or seating area, a number of multi-level seats, such as 704, are adjacent to a number of single-level seats, such as 702 and/or 706.

In one embodiment, for the single-level seats 706, there are at least two rows of seats, such as 712 and 714, with one row, such as 712, in front of the other row, such as 714. Again there is an aisle or path or walkway 708 to access the single-level seats 706. At least one seat in each row is adjacent to the aisle 708. For example, a seat 716 in a row 712, and another seat 718 in another row 714, are adjacent to the aisle 708. The aisle 708 again allows passengers to access the single-level seats 706.

For the single-level seats 706, there are no seats above or below them. Note that the single-level seats 706 are on a floor, and there can be seats below the floor. Also, there can be a ceiling on top of the single-level seats 706, and there can be seats above the ceiling. However, within the same cabin or seating area, there are no seats above or below the single-level seats 706.

The single-level seats 706 can be standard seats in standard seating arrangements. For example, they can be seats in a conventional airplane.

The multi-level seats 704 can be one of the multi-level seat embodiments previously described. For example, there are at least two rows of seats arranged in two levels, a top row and a bottom row, with at least the bottom-row seats having seat backs. At least a portion of each of the seats in the top row is below an imaginary flat surface formed by the top point of the seat backs of at least two bottom-row seats. In one embodiment, the multi-level seats are staggered, where the seats in the top row overlap the seats in the bottom row. In another embodiment, for the multi-level seats, the bottom row seats are on a floor; and there is at least one imaginary horizontal plane that is parallel to the floor, and that at least a part of the top row seats and at least a part of the bottom row seats intersect.

The multi-level seats 704 again can be accessed through the aisle 708. At least a first bottom-row seat 710, is adjacent to the aisle 708. A second bottom-row seat, such as 720, is adjacent to the first bottom-row seat 710, but not adjacent to the aisle 708. In one embodiment, the second bottom-row seat 720 is slidably attached to the transportation vehicle to allow a passenger in the seat 720 to access the aisle 708. As an example, a seat has a seat back and a seat base. The seat is slidably attached or mounted on a floor (or surface) when the seat base (or at least a point on the seat base) can be moved in the forward and backward directions relative to the floor (or surface).

In one embodiment, the top-row seats cannot be slid relative to the cabin or seating area when they are in use by the passengers. In other words, once in place, at least one point at each of the top-row seats is stationary relative to the cabin or seating area.

In one embodiment, a mixed-seating arrangement has an added advantage of preserving a certain area as used in a conventional one-level seating arrangement. Some passengers might feel more comfortable or accustomed to such one-level seating arrangement, which has been around for decades.

Figure 22:
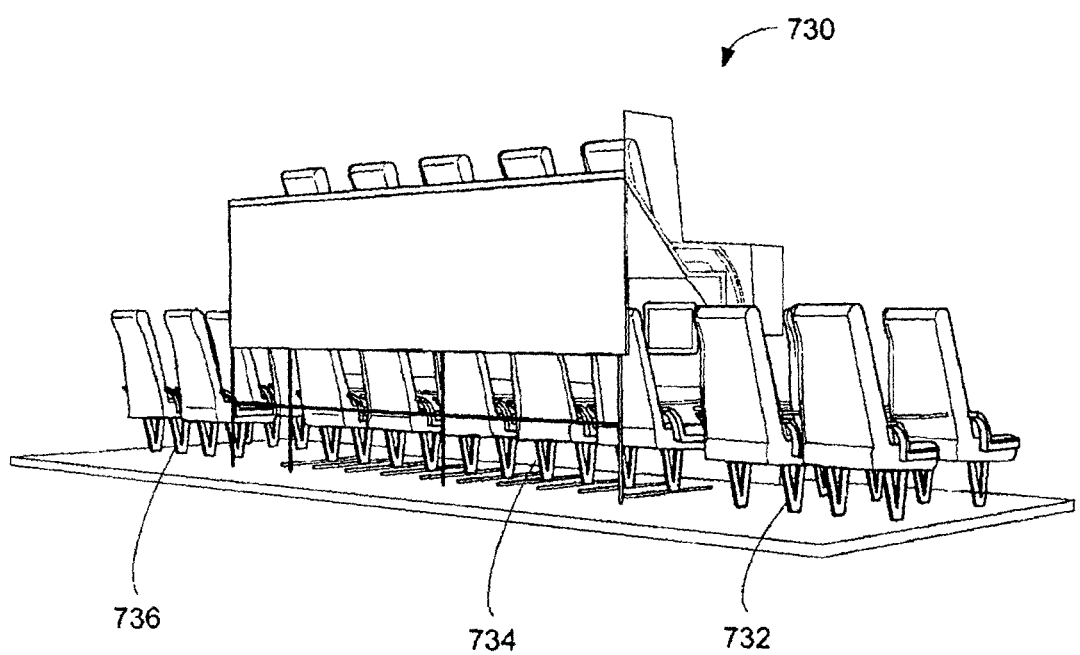
FIG. 22 shows a 3-D view of a mixed-seating arrangement according to one embodiment of the invention.

FIG. 22 shows a 3-D view of a mixed-seating arrangement 730 according to one embodiment. The arrangement 730 shows an area 734 of multi-level seats, sandwiched between two areas of single-level seats 732 and 736. In this embodiment, all the seats face forward with a similar orientation.

As an example, the mixed seating arrangement is applied to Airbus A330. Conventionally, it can have 8 seats in a row. The 8 seats can be arranged in a 2-4-2 manner, with four seats in the middle, an aisle on each side of the four seats, and 2 additional seats on the other side of each of the aisles. Instead of having all seats in one level, in one embodiment, the middle 4 seats are 2-level seats, and the other 4 seats (2 on each side) are single-level seats.

Figure 23:
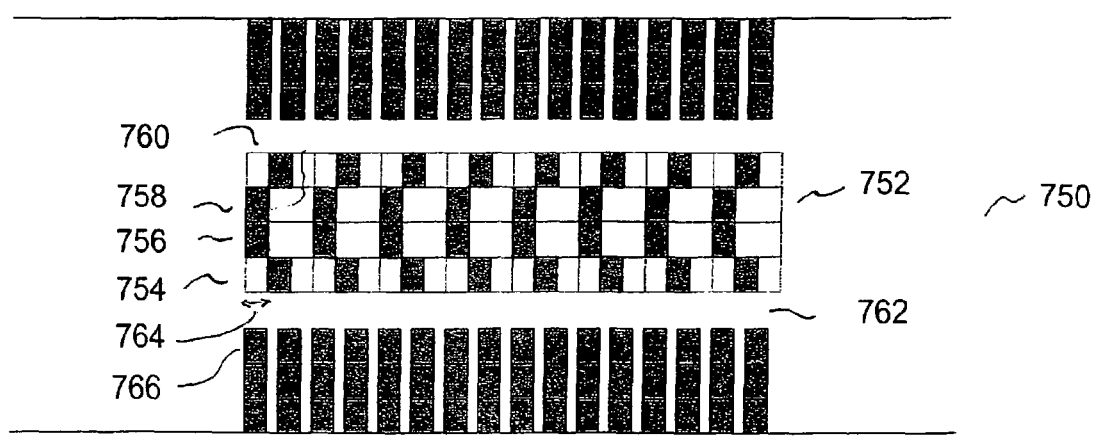
FIG. 23 shows a mixed-seating arrangement according to another embodiment of the present invention.

FIG. 23 shows another embodiment 750 of a mixed-seating arrangement. In this embodiment, for the multi-level seats, only the seats in the bottom rows are shown. To illustrate, there are at least three bottom-row seats arranged in a row, such as the seats 754, 756 and 758 in the bottom-row 760. One of the seats is adjacent to an aisle 762, and is an aisle seat, 754. In this example, the other two seats 756 and 758 are not adjacent to the aisle 762. All three of the bottom-row seats are attached to a floor of the seating area so that they are not designed to be slid relative to the seating area when they are in use by the users. In other words, once in place, at least one point at each of these seats is stationary relative to the floor of the seating area.

In addition, at least the middle seat of the three bottom-row seats is attached to the floor, or constantly positioned (e.g. for the entire duration of a trip) on the floor behind at least one of the other bottom-row seats. For example, the bottom-row seat 756 is attached or positioned behind the aisle seat 754. The amount of distance 764 that the seat 756 is behind the aisle seat 754 can be about the length of an access open space. This creates extra seating space for the middle-seat or inner-seat passenger. One reason allowing such a passenger the extra comfort is that no passenger needs to go through or past that middle or inner seat to access the aisle 762. The aisle seat passenger can get to the aisle, for example, simply by lifting up an armrest, which would create ample room for the passenger to move to the aisle. The aisle passenger does not have to, for example, slide her seat backwards to move out of the seat. As to the middle-seat or inner-seat passenger, she also could easily access the aisle with a minimal, or with no, sliding movement of her corresponding seat, but may need to lift up an armrest.

In one embodiment, a multi-level seating arrangement is for a transportation vehicle that moves on land, such as a bus. As an example, the bus can have top row seats and bottom row seats. The top row seats can be similar to top row seats shown in FIG. 7. In one embodiment, at least a portion of each of the seats in the top row is below an imaginary flat surface formed by the top point of the seat backs of at least two bottom-row seats.

The seats can be arranged in a two-by-two manner, where a row of two seats is separated by an aisle from another row of two seats. The aisle allows passengers to access the seats. Each row of two seats includes an aisle seat and a window seat. The aisle seat is adjacent to the aisle. The interior seat is not adjacent to the aisle, and can be a seat next to a window. For the interior seat in the bottom row, it can be next to a bottom window. For the interior seat in the top row, it can be next to a top window.

In one embodiment, the interior bottom seats are movably attached to a floor or surface of the bus to allow the seats to move, such that a passenger in an interior seat is able to access the aisle without requiring a passenger in the aisle seat of that row to move. For example, an interior seat passenger could slide the seat backward or behind the corresponding bottom aisle seat to create an access open space. The passenger could then access the aisle by walking behind the bottom aisle seat. In one embodiment, an interior bottom seat is slidably attached to a surface, which is fixed to a floor of the bus. In another embodiment, an interior bottom seat is slidably attached to a surface if at least a point on the seat base of the seat could be moved relative to the surface.

In another embodiment, the interior bottom seats are fixed relative to the bus when the seats are in use by passengers. However, the interior bottom seat in a row is attached to the bus behind the aisle seat in that row to allow a passenger in the interior seat to access the aisle by walking behind the aisle seat.

A number of multi-level seating arrangements have been described. Some of them are mixed with single-level seating arrangements. In one embodiment, a computer-implemented method is applied to one or more of the described seating arrangements. The method allows displaying visual representation(s) of one or more top-row seats and visual representation(s) of one or more bottom-row seats.

The visual representations may be accessed from a website or in a computer that is wired or wirelessly accessible by another computing device through a network. In the following description, the representations are assumed to be accessible from or reside on a website.

To illustrate, the seating arrangements are provided by a transportation vehicle. In one embodiment, the website is controlled by the company providing the transportation service through the vehicle. For example, the website is controlled by an airline, which provides passenger seats. In another embodiment, the site is controlled by a third party independent of the company providing the transportation service through the vehicle. For example, an independent entity can host a website for multiple airlines. The entity is a separate organization or corporation of the multiple airlines.

Figure 24:
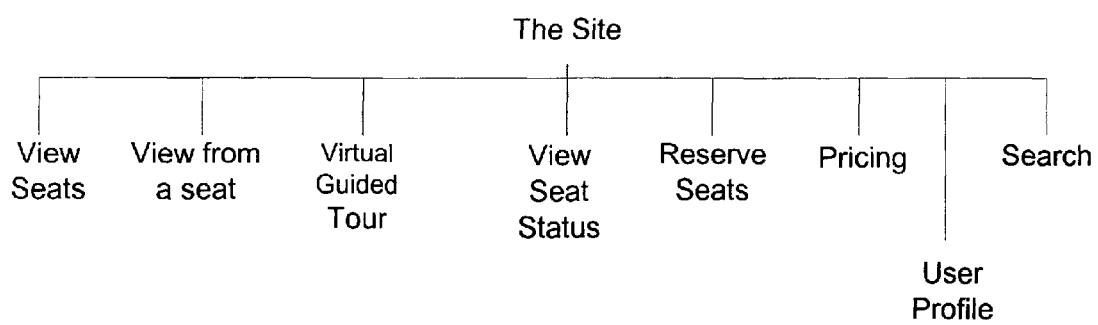
FIG. 24 shows a number of features regarding a seat provided by a site accessible through a network according to different embodiments of the present invention.

FIG. 24 illustrates examples of a number of features provided on a website according to different embodiments. These different features can be used individually, or in different or any combination. As described, a user can gain access to the website to view the different visual representations of the one or more seats. The representations can include a resting position and one or more non-resting positions of a seat. In one embodiment, the visual representations can be actual images of the seats. In another embodiment, the visual representation can be models or simulations of the seats.

In another embodiment, the website also provides views from a seat, such as from the perspective of a user sitting on the seat. This can include what the user would see if the user is sitting on the seat. The view information can, for example, pertain to a takeoff position, and/or a resting position.

In yet another embodiment, a virtual-guided tour of a seat can be provided to the user. The tour can include ways to access the seat from an aisle or a pathway to the seat. The tour can explain how to operate the seat and/or its storage compartment/area. The tour can also include how a flight attendant would serve the user, e.g., serve food and drink. The tour may also include how the user should react in an emergency situation.

In one embodiment, the status of a seat is also provided to the user, such as whether the seat has already been taken or reserved by another user or passenger. In one embodiment, a layout of seats in an area is provided to the user. There could be visual indications for seats that have already been taken by other users. For example, there can be a mark on a seat that has already been reserved by another user. As another example, a seat that has been reserved is not shown in the layout of seats. These visual indications assist the user in reserving a seat.

In yet another embodiment, the website allows the user to reserve a seat. The user could reserve a seat remotely through a network, which could include a wireless network. After the user has reserved a seat, the website can also provide feedback to the user that the seat has been reserved. The feedback can be a visual indication on the seat that the seat has been reserved.

Figure 25:
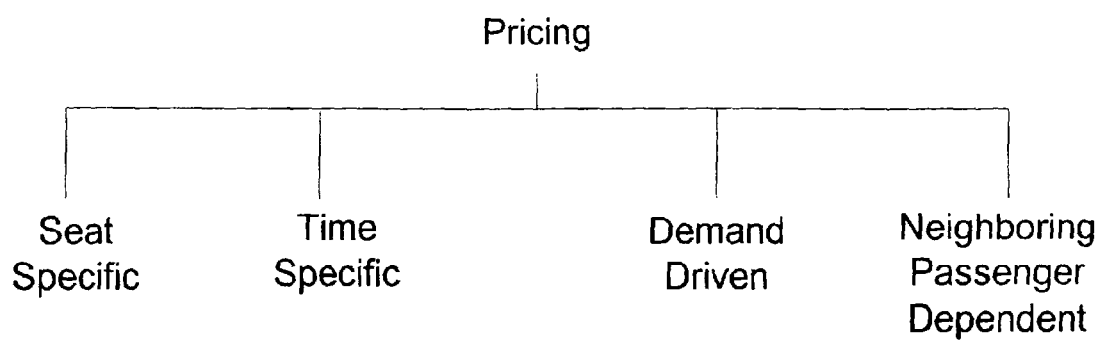
FIG. 25 shows a number of embodiments regarding pricing according to the present invention.

In one embodiment, the site also provides pricing information for the seats. FIG. 25 shows a number of embodiments regarding pricing. For example, the pricing can be seat specific, time specific, demand driven and/or neighboring-passenger dependent.

Regarding variable pricing where the pricing is seat specific, different seats can have different pricing. Such specificity could include seats in the same area or cabin. To illustrate, for multi-level seats, a bottom-level seat can have a different price than a top-level seat. Seats in the same row and of the same level can also have different pricing. For example, referring to FIG. 22, the price for the inner seat 720 can be different from that of the aisle seat 710. Seats on adjacent sides of an aisle can have different pricing. For example, referring to FIG. 23, the price of a single-level seat, such as 766, can be different from the price of an adjacent seat, such as the seat in the bottom row of a double-level seat, such as 754.

Pricing for seats can also depend on storage, e.g., luggage space. This is particularly applicable to a seat with its own storage space. As described for seats in the multi-level seating arrangements, in a number of embodiments, each seat can have its own storage area for luggage. In one embodiment, the storage area can also be subject to reservation and is separately priced. For example, a user can reserve a seat without reserving the corresponding storage area. In another embodiment, a user can reserve a seat and ask for additional storage area. The pricing can be dependant on the amount and/or location of storage area(s).

Pricing for seats can also depend on their proximity to toilets. For example, regarding toilets in an area with a multi-level seating arrangement, in one embodiment, there are upper-level seats above the toilet(s). The pricing for seats above a toilet, in one embodiment, can be different from seats with no toilets below them.

In one embodiment, there could be a layout of seats in an area, with each seat having a price tag on it.

Regarding variable pricing where the pricing is time specific, in one embodiment, reserving a seat at different time can require paying a different price. For example, reserving a seat one month in advance is different in price from reserving a seat for tomorrow. As another example, the seating arrangement is in a transportation vehicle, and reserving a seat on Saturday is different in price from reserving a seat on Tuesday.

Regarding variable pricing where the pricing is demand driven, in one embodiment, the price of a seat changes as the demand for the seat changes. For example, the change can be set by the provider, such as an airline, providing the seats. If the provider decides that the demand for seats in the upper-level is higher than normal during specific time period, the provider can dynamically change the price. In another example, the change is initiated by the users or passengers. For example, the website can allow users to bid for seats. Based on the price bid by users, the price of a seat dynamically changes. The website can require the bidding for a seat not to be lower than a certain price.

Regarding pricing that depends on neighboring passenger, in one embodiment, when a user reserves a seat, the user could put specific limitations to his immediate neighboring passenger(s). The pricing of the seat can depend on at least one attribute of a passenger sitting next to the user.

One attribute could be age related. The user could require neighboring passenger(s) not to be a toddler below such as 2 years old, or a family with a toddler below 2. For airlines, a toddler below 2 is typically free so during seat reservation, the age of such a toddler is voluntarily given to the airlines.

One attribute could be the sex of the neighboring passenger. The user can ask for the neighboring passenger to be of the same or opposite sex.

One attribute could be related to a piece of location information regarding the neighboring passenger. For example, the user might like to sit next to (or not sit next to) a person living in her neighborhood. The user could ask for the neighboring passenger to have provided the same city information or zip code information (or zip code within 20 miles of the user) during seat reservation.

One attribute could be related to the company or industry of the user. For example, the user might like to sit next to a person working in the same company or industry. Sometimes during seat reservation, company information is provided. The user might ask for the neighboring passenger to be from the same company or industry.

One attribute could be related to the profession of the user. For example, the user is a doctor, and the user might like to sit next to another doctor. The user might ask for a doctor to be his neighboring passenger.

Another attribute regarding neighboring passenger is that there is no neighboring passenger. The user might ask for neighboring seats to be left vacant.

The user could make one or more of the above request during seat reservation. The user could be charged accordingly for his reservation. For example, the ticket price could increase by 10% if the user asks for neighboring seats to be left vacant. In one embodiment, the company providing the seats, such as the airlines, would try to accommodate the user. If the company fails to satisfy the user, the user would be refunded the extra amount charged. In another embodiment, the user will be charged if the airlines could satisfy the request(s).

In another embodiment, as long as the passenger is willing to pay the premium, the company would satisfy the user. For example, the ticket price is increased by 15% if the user asks for no toddler or family with toddler to be his neighboring passengers. As long as the user is willing to pay the extra amount, the airline would not place toddlers or a family with toddlers in his neighboring seat(s).

Other attributes regarding the neighboring passengers affecting pricing could include the weight, the ethnicity and the health condition of the neighboring passenger(s).

Returning to FIG. 24, in one embodiment, the website keeps track of user preferences or user past history. For example, when a user reserves a seat, the site asks the user to enter a user name. Based on the user name, the website creates a user profile for the user. The user profile stores at least one piece of information regarding the user. Based on the user name, next time when the user accesses the website, the website would retrieve the corresponding user profile. The site could then ask the user questions, such as whether the user would like to access a similar seat.

In seat reservation, seat identification can also be based on information in a user profile regarding the user. For example, users can be categorized into different classes, such as premier class passengers and frequent flyers. The website or the corresponding service provider could block off some seats for premier-class users, and make them not available to the public. The unavailability could be time sensitive. For example, the blocking off would be removed a week before the specific transportation date.

In one embodiment, the website also provides search capabilities, such as through a search engine. The search can be template based. For example, there can be a template with locations or slots for entries. There can be a pull-down menu next to an entry. The entries can be for viewing the types of seats. By selecting the type of seat to be viewed from a pull-down menu, a user can view the seat from the website. There are different techniques to implement such a template. One way is based on SQL queries. After a user has input entries into the locations or slots, such as by selecting options from pull-down menus, SQL queries would be generated to access information from a database. Based on the information accessed, an appropriate response would be composed for the user.

In one embodiment, there are multi-level templates. After a user provides entries into a template, the template could extract another template for the user. The another template asks for additional information so as to provide a better response for the user. The interactive nature of multiple templates sometimes could provide better user experience. Users sometimes prefer entering information into multiple templates than providing a lot of information in one template.

The search capabilities can be linked to seat reservation. For example, the entries are for entering dates and time. By entering such information into a template, the website would provide the user information related to seats available to be reserved. Pricing information can also be provided. There can be icons next to the seats. By selecting an icon next to an available seat, the user can be provided with different views or virtual-guided tour regarding the seat. Other entries can include the type of seats, such as upper-level seats, window seats, aisle seats and lower-level seats. These different types can be selectable by the user, for seat reservation. In another embodiment, one entry pertains to pricing, such as the lowest cost, the maximum amount of money the user is willing to pay for a seat, etc. Based on the information entered, the website would try to identify seats available for the user. If the website keeps a user profile of the user, such seat identification can also depend on information in the user profile.

In one embodiment, the website allows a user to search for information in a natural-language manner. A user could enter a natural-language question into a dialog box on the website. The website analyzes the question and provides a response to the user. For example, the user could ask the following questions: Do you have upper-level seats that are not aisle seats below $200 on December 1$^{st}$ from San Francisco to New York? May I look at a lower-level seat? What types of food do you serve for your flight from Los Angeles to Shanghai? Implementing different types of natural-language search capabilities should be obvious to those skilled in the art, and would not be further discussed. In one embodiment, if the website could not understand the question or inquiry, the website would ask the user to provide entries into a template to get responses.

In one embodiment, the Web site is created using web development techniques for interactive web applications, such as Ajax or Asynchronous JavaScript and XML. Such development techniques can reduce the wait time in using the web, such as by having Web pages updated behind the scenes.

Figure 26:
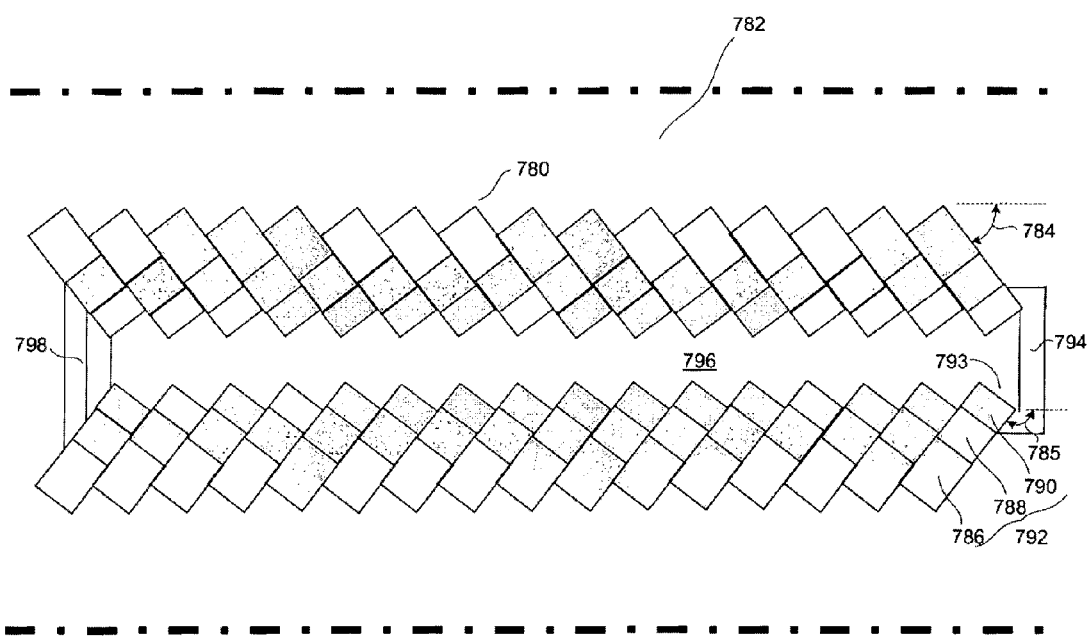
FIG. 26 shows a top view of upper level seats of multi-level seats according to one embodiment of the invention.

FIG. 26 shows a top view of upper level seats of multi-level seats, such as the set 780, according to one embodiment of the invention. They can be located in a fuselage or sitting area 782. In this embodiment, the seats are arranged not directly facing the front (fore) or the back (aft) of the sitting area 782. Instead, there is at least one row of seats, extending across the longitudinal direction of the sitting area. In FIG. 26, two rows of seats are shown. Unlike a number of other embodiments, the rows shown in FIG. 26 do not extend across the transverse direction of the sitting area, but across the longitudinal direction, such as from the fore to the aft of the sitting area 782. One row of seats in FIG. 26 is arranged with each seat at an acute angle 784 from the longitudinal axis of the sitting area, while the other row of seats is arranged at an obtuse angle 785 from the longitudinal axis. The two rows of seats are located in a symmetrical manner about the middle of the sitting area.

In this example, the acute angle 784 can be approximately 45 degrees. By changing the acute angle, one can accommodate fuselage areas of different width. For example, the width of Boeing 747 is approximately 240", 787 is approximately 229", and Airbus A350 is about 220". The acute angle can be larger for a plane with a wider width. In one embodiment, the configuration shown in FIG. 26 is applicable to, for example, A350 and 787 Dreamliner or 777-200 with the acute angle 784 ranging from 20 to 70 degrees. In another embodiment, the acute angle can range from 20 to almost 90 degrees. In yet another embodiment, the "acute angle" can range from 0 to 180 degrees.

Note that FIG. 26 is drawn to scale. As an illustration, if the figure is for the fuselage of 787 Dreamliner, then the width of the sitting area shown in the figure is about 226", and the width of each seat is about 18.8".

In FIG. 26, the seats are shown to be in their resting position. For example, for the seat 792, the figure shows the top view of the seat back 786, the seat base 788 and the leg rest 790, which can have a storage bin below.

In this embodiment, all of the upper-level seats are adjacent to an upper level aisle. With an adjacent aisle, a passenger can access each of the seats directly from the aisle, without the need to go through or across another seat. To illustrate, to access the seats, a passenger can walk up one or more steps 794 to reach an upper level aisle 796. As shown in the figure, all the upper level seats can be adjacent to the aisle 796. To get to a seat, the passenger walks down the aisle, towards the seat. In front of the seat, there is a standing space, such as the space 793 in front of the seat 792. In this example, the standing space is contiguous to or a part of the upper level aisle 796. The passenger can stand at the standing space in front of the seat and then get on the seat.

At the other end of the aisle 796, there can be another set of one or more steps 798 to allow a passenger to walk down from the upper aisle 796.

In one embodiment, the upper corner of the seat backs can be rounded to reduce the intrusion of the seats into the aisle. With such rounded corners, the width of the aisle can be reduced.

The configuration shown in FIG. 26 has a number of additional benefits. For example, neighboring multi-level seats are not right next to each other, with seat back aligned to seat back and seat base aligned to seat base. Instead, each seat extends forwards or backwards relative to its neighboring seats. With such a configuration, each passenger substantially has the full use of his arm rest, without the need to share them with his neighboring passengers. With both arm rests relatively free for a passenger's use, in one embodiment, the seat width is effectively increased by 2" relative to conventional seats with seats fully aligned right next to each other. Also, regarding the embodiment shown in FIG. 26, opposite seats do not face each other. Relative to the longitudinal or fore-aft axis, for opposite seats, one is at an acute angle and the other is at an obtuse angle. Passengers in such opposite seats are not forced to face or look at each other.

In one embodiment, the seats shown in FIG. 26 can be rotated. For example, the seats are for a plane. During plane takeoff, the seats can be in their takeoff position, with seat backs pointing upwards, and leg rests downwards. The seats can be rotated so that they point towards the fore-aft or longitudinal axis of the sitting area, which some passengers might find more comfortable during plane takeoff.

Figure 27:
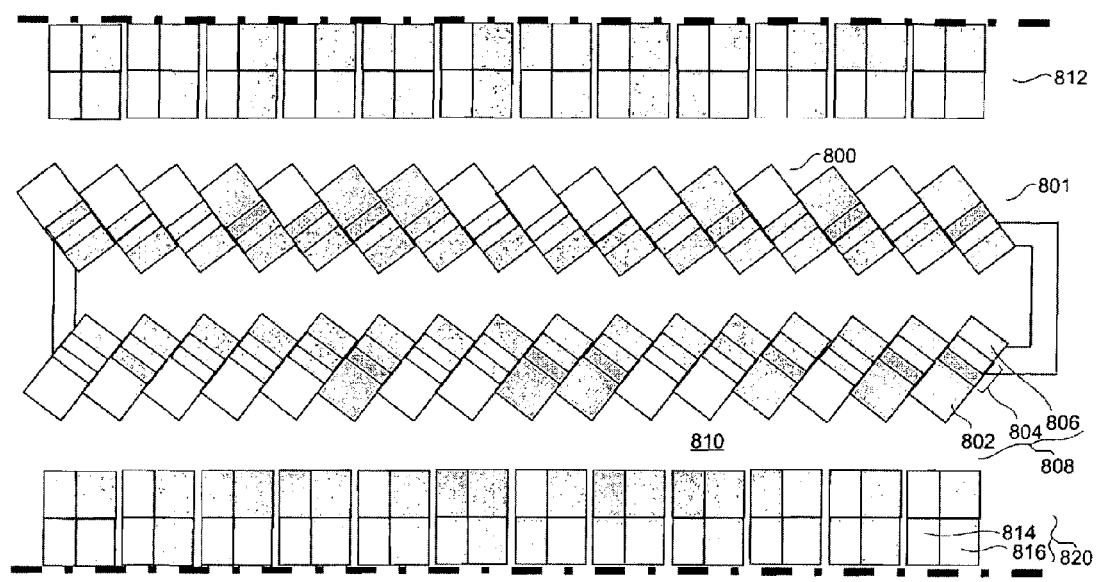
FIG. 27 shows a top view of lower level seats of multi-level seats according to the embodiment of the invention shown in FIG. 26.

FIG. 27 shows a top view of lower level seats of multi-level seats, such as the set 800, according to the embodiment shown in FIG. 26. Such embodiment requires at least one row of lower-level seats. In FIG. 27, two rows of lower level seats are shown. Again one row 801 of the lower level seats is arranged at the acute angle from the longitudinal axis of the sitting area. The seats are shown to be in their resting position. For example, for the seat 808, the figure shows the top view of the seat back 802 and the seat base 806. The figure also shows a storage bin area 804 below the seat back 802 and the seat base 806.

Each of the lower level seats is adjacent to a lower level aisle. For example, the seat 808 is adjacent to the lower level aisle 810.

One way to access a lower level seat is from a lower level aisle. A passenger walks to the lower level seat from its corresponding lower level aisle. The seat can be in its upright position. Then, the passenger moves the seat backwards to produce a walking space between the seat and its adjacent seat, for example, as described in some of the previous embodiments.

Regarding moving forward or backward, in one embodiment, the seat is moved forward or backward relative to the orientation of the seat. In other words, the seat is not moving forward or backward along the longitudinal direction of the sitting space, but, for example, can be in a direction substantially perpendicular to the seat back, to create the walking space.

The walking space allows, for example, the passenger to walk to the front of the seat to sit down. In other words, the lower level seat is moved relative to the sitting area to allow a passenger to get in and out of the seat to access another part of the sitting area, such as the lower level aisle 810. Again, the outside corners of the seat bases of the lower level seats can be rounded to create more room for passengers to access the seats.

FIG. 27 also shows single-level seats, such as the set 812. These can be conventional or standard single-level seats. In other words, the seating arrangement shown in FIG. 27 is a mixed seating arrangement with both multi-level seats and single-level seats. The single-level seats are substantially in their normal sitting position, or in their take off position. For example, the figure shows the seat back 814 and the seat base 816 of the single-level seat 820. In the figure, all the seats, whether single-level or multi-level, are of the same or almost the same dimensions.

The embodiment shown in FIGS. 26-27 can maintain at least the same number of seats as in a conventional or standard transportation vehicles. One can illustrate with a Dreamliner. To calculate approximate number of seats for a 787, assume the cabin width is about 226". Typically, dependent on economic reasons, different airlines can use seats with a seat width of 19", 20" or even 22", and with a seat pitch from 30" to 34". Some airlines can even use 27" seat pitch for short hauled flights. Assume that a typical US airliner uses a seat pitch of 33" and a seat width of 20.5" for their economy class seats. Further assume the airliner puts in 9 seats per row. Then, the total number of seats in a conventional Dreamliner is about 297. For the mixed cabin seating configuration shown in FIGS. 26-27, in one configuration, the seat width is chosen to be 18.8". Though the seat width is less than 20.5", as explained above, with both arm rests relatively free for a passenger's use, the seat width is effectively increased by 2". If the acute angle for the seats is about 53 degrees, there could be 316 seats, with 132 single-level seats (33 by 4) and 184 multi-level seats (46 by 4).

Figure 28:
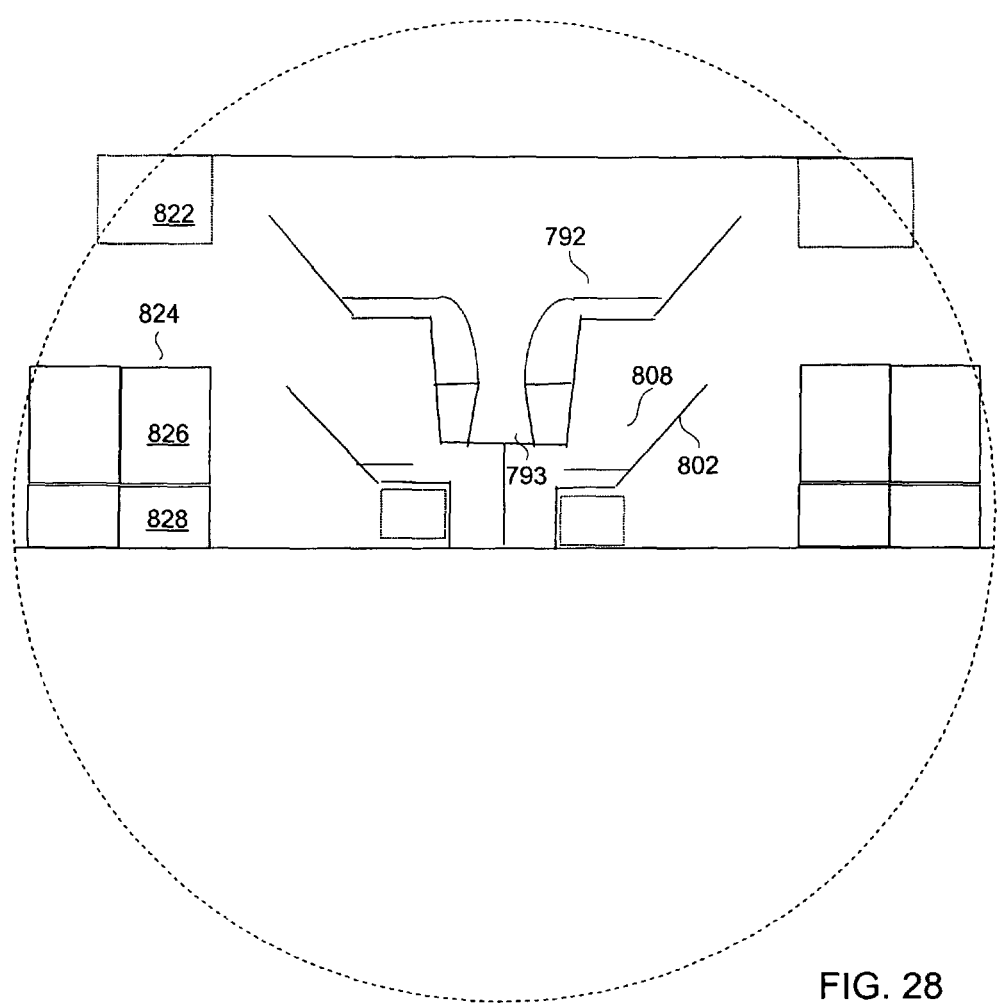
FIG. 28 shows a cross-sectional view of multi-level seats according to the embodiment shown in FIGS. 26-27.

FIG. 28 shows a cross-sectional view of multi-level seats according to the embodiment shown in FIGS. 26-27. Since the multi-level seats are positioned at acute and obtuse angles from the longitudinal axis of the sitting area, a different cross-section could produce a different cross-sectional view.

FIG. 28 shows a number of multi-level seats, such as the upper level seat 792 staggered over the lower level seat 808. FIG. 28 also shows the standing space 793 in front of the seat 792. It is a space that a passenger can stand in front of the upper level seat or top-row seat. The space can be used to access the upper level seat. In one embodiment, at least a portion of the standing space is below at least a portion of the seat backs of the lower level or bottom row seats. For example, at least a portion of the standing space 793 in front of the upper level seat 792 is below at least a portion of the seat back 802 of the lower level seat 808. As shown in the figure, in one embodiment, the seat back 802 can include an area for a passenger to rest her head or a head rest.

FIG. 28 also shows a number of single-level seats, such as 824, in the same sitting area of the multi-level seats. Above the single-level seats, there can be storage bin, such as the storage bin 822 above the single-level seat 824. The figure also shows a seat back 826 and a leg rest 828 of the single-level seat 824.

Figure 29:
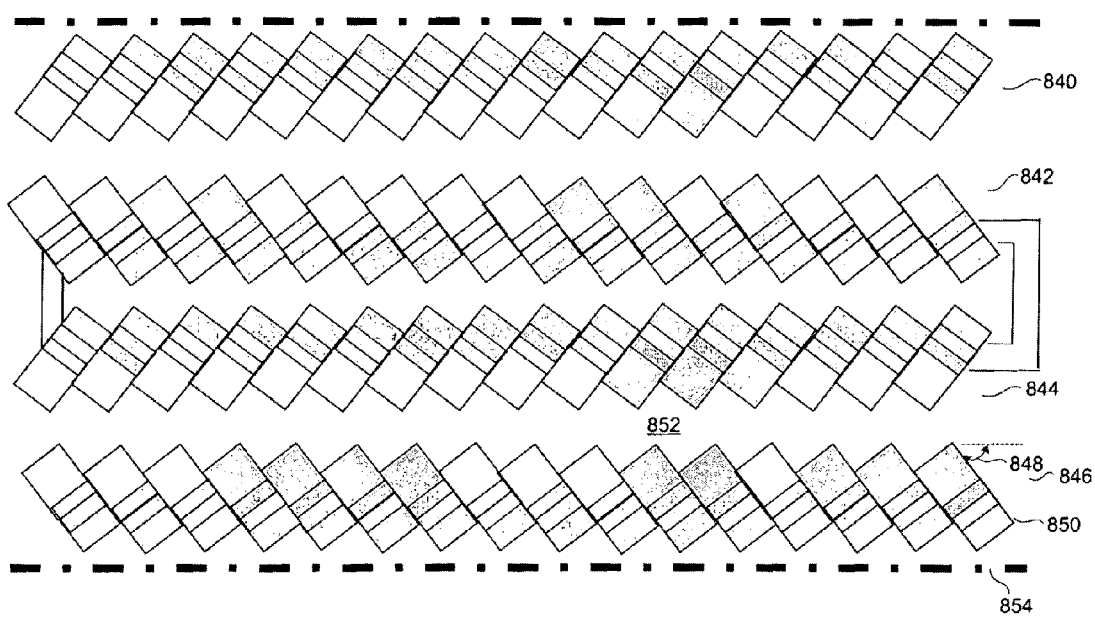
FIG. 29 shows a top view of lower level seats of multi-level seats with single-level seats according to another embodiment of the invention.

The arrangement of the single-level seats does not have to be similar to conventional seats. In one embodiment, the single-level seats are also arranged at an acute or obtuse angle from the longitudinal axis of the sitting area. FIG. 29 shows one example of such single-level seats. In FIG. 29, there are four rows or sections of seats, namely 840, 842, 844 and 846. The middle two rows of seats are the bottom level seats or lower level seats of a multi-level seating arrangement. They could be similar to the lower level seats shown in FIG. 27. Parallel and next to each row of lower level seats, there is a row of single-level seats, such as the row of seats 840 next to the row 842 of lower level seats.

In FIG. 29, the single-level seats are also arranged at an acute or obtuse angle from the longitudinal axis of the sitting area. For example, the single-level seat 850 is arranged at an acute angle of 848.

In the example shown in FIG. 29, each of the single-level seats can be facing a window, such as the single-level seat 850 facing the window 854. Each of the single-level seats is also adjacent to a lower level aisle. For example, the set 846 of single level seats is adjacent to the lower level aisle 852. This aisle 852 is also adjacent to a set 844 of lower-level seats. In this example, the set 844 of lower-level seats and the set 846 of single-level seats is shown to be substantially symmetrical about the lower level aisle 852. But such symmetry is not necessary. In one embodiment, again the upper corner of the seat backs can be rounded to reduce the intrusion of the seats into the aisle. With such rounded corners, the width of the aisle can be reduced.

One approach to access a single level seat in FIG. 29 can be similar to accessing a lower level seat in FIG. 27. The seat can be in its upright position. Then, a passenger moves the seat backwards to produce a walking space between the seat and its adjacent seat. The walking space allows, for example, the passenger to walk to the front of the seat to sit down. In other words, the single level seat is moved relative to the sitting area to allow a passenger to access and sit from the lower level aisle.

In one embodiment, the outside corners of the seat base of the lower level seats and the single level seats shown in FIG. 29 can be rounded to create more room for passengers to access the seats from outside.

Figure 30:
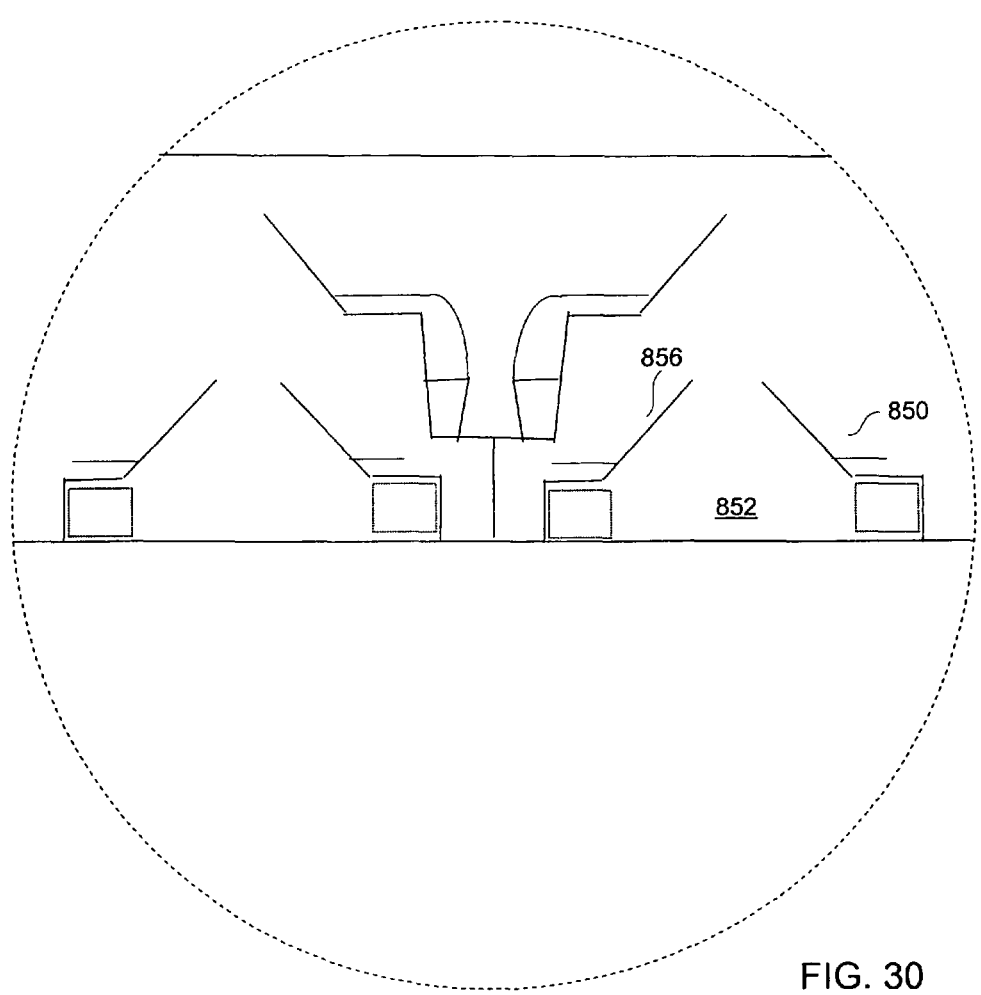
FIG. 30 shows a cross-sectional view of the embodiment shown in FIG. 29.

FIG. 30 shows a cross-sectional view of the embodiment shown in FIG. 29. In this example, the multi-level seats are similar to the multi-level seats shown in FIG. 28. On the other hand, the arrangements of the single-level seats are different. In the embodiment shown in FIG. 30, the single-level seats are arranged at an acute or obtuse angle relative to the fore-aft or longitudinal axis. In the example shown, the single level seat 850 is arranged symmetrically with the lower-level seat 856 about the lower level aisle 852. However, the single-level seats may not be symmetrical to the lower-level seats about an aisle.

Figure 31:
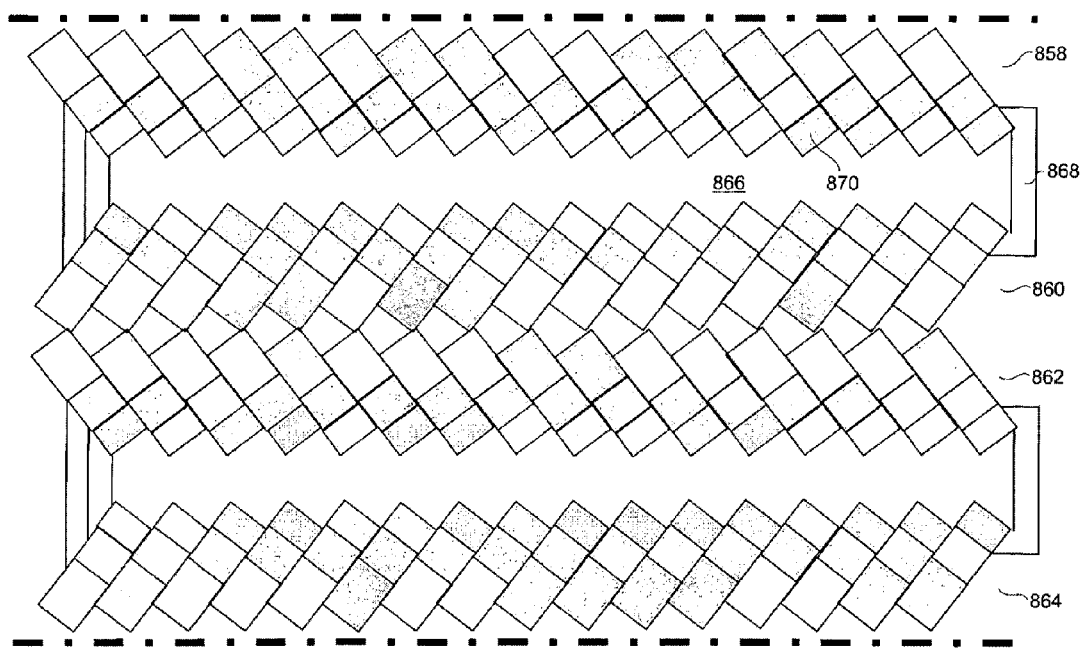
FIG. 31 shows a top view of upper level seats of multi-level seats according to yet another embodiment of the invention.

FIG. 31 shows a top view of upper level seats of multi-level seats according to yet another embodiment. In this embodiment, there are four rows of upper level seats extending longitudinally across the sitting area, and they are 858, 860, 862 and 864. The four rows of upper level seats include two identical pairs of two rows of seats. One pair is 858 and 860, while the other is 862 and 864. Each pair is similar to the arrangement shown in FIG. 26, with an upper level aisle between them. For example, the aisle 866 is between the pair 858 and 860. Again, each upper level seat is adjacent to an upper level aisle to allow a passenger to access the seat from the corresponding aisle. For example, a passenger could walk up one or more steps 868 to the upper level aisle 866 to access the seat 870.

Figure 32:
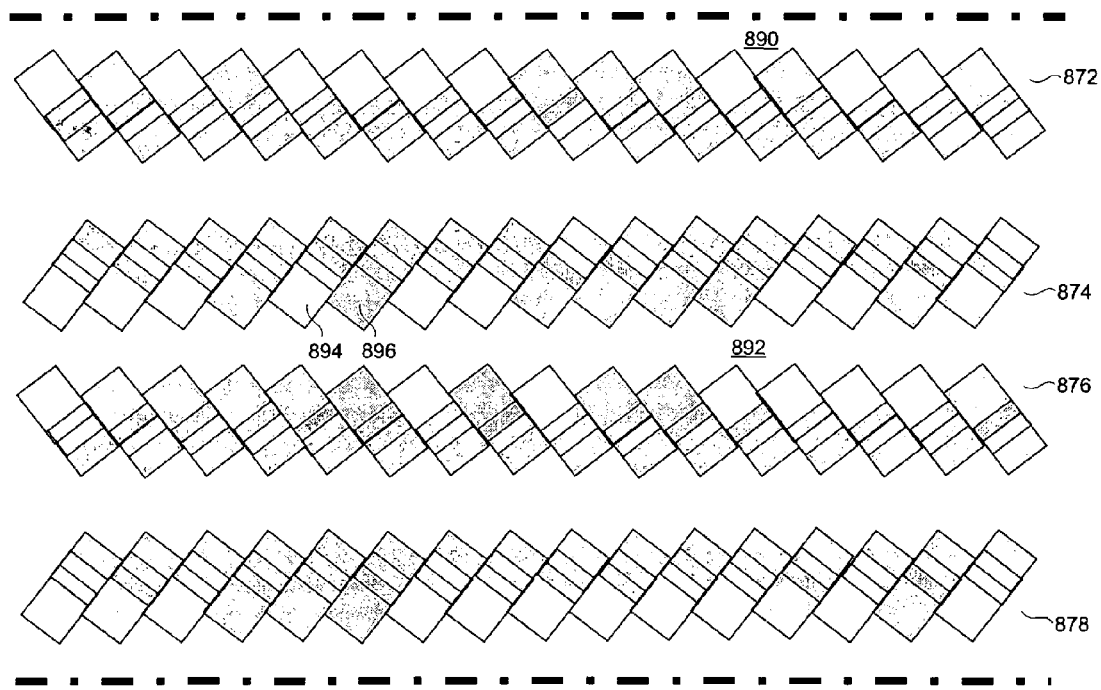
FIG. 32 shows a top view of lower level seats of multi-level seats according to the embodiment of the invention shown in FIG. 31.

FIG. 32 shows a top view of lower level seats of multi-level seats according to the embodiment shown in FIG. 31. Again there are four rows of seats extending longitudinally across the sitting area, and they are 872, 874, 876 and 878. Again, the four rows of lower level seats include two identical pairs of two rows of seats. One pair is 872 and 874, while the other is 876 and 878. Each pair is similar to the lower level seating arrangement shown in FIG. 27, with lower level aisles on the outside of the pair. For example, a lower level aisle 890 is on one side of the pair 872 and 874, while another lower level aisle 892 is on the other side of the pair. Again, each lower level seat is adjacent to a lower level aisle to allow a passenger to access the seat from the corresponding aisle. For example, a passenger could walk down the lower level aisle 892 to reach the back of the seat 894. Then the passenger moves the seat 894 backwards to walk between the seats 894 and 896 to sit onto the seat 894.

Again in one embodiment, the upper corners of the seat backs can be rounded to reduce the intrusion of the seats into the corresponding aisle. Also, the outside corners of the seat base of the lower level seats can be rounded to create more room for passengers to access the seats from outside.

The embodiment shown in FIGS. 31-32 can provide more seats than the embodiment shown in FIGS. 26-27. Again use a Dreamliner as an example, and assume the acute angle for the multi-level seats is 45 degrees. With a seat pitch of 33" and a seat width of 18.8", there could be 328 multi-level seats (41 by 8).

Figure 33:
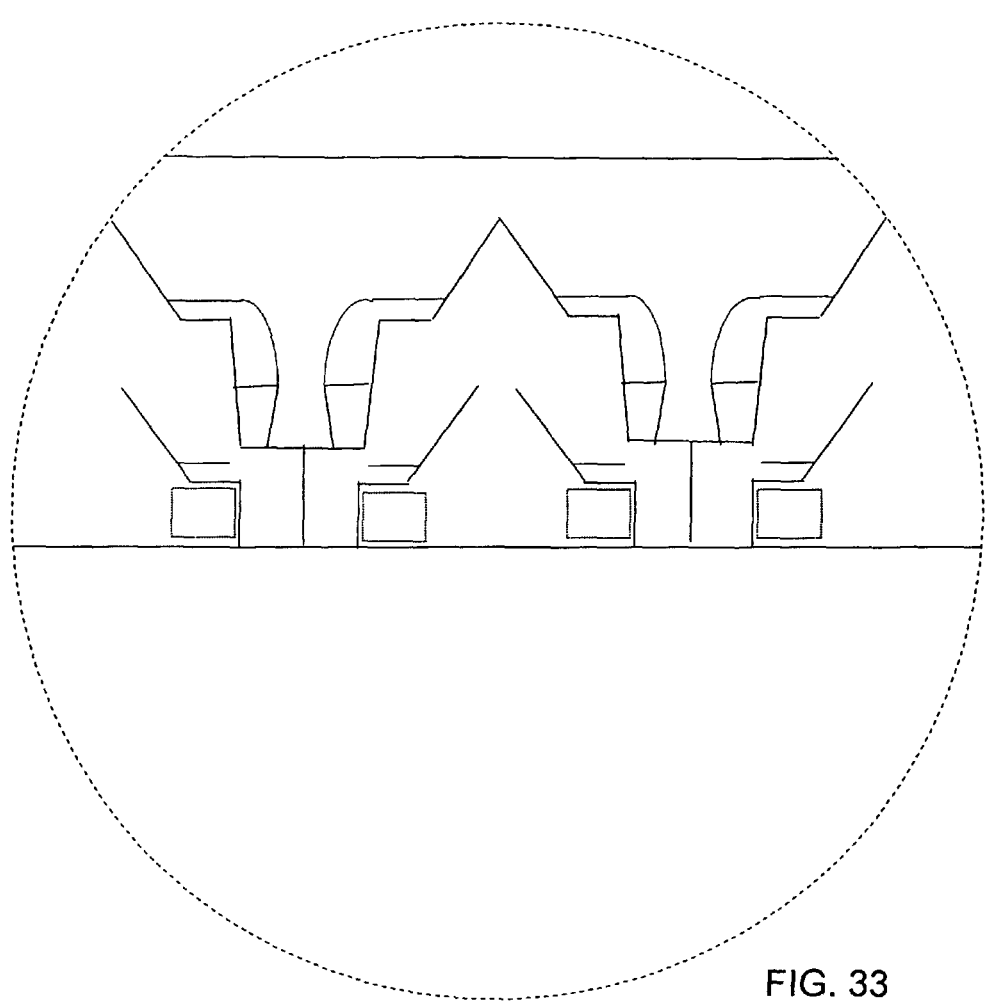
FIG. 33 shows a cross-sectional view of the embodiment shown in FIGS. 31-32.

FIG. 33 shows a cross-sectional view of the embodiment shown in FIGS. 31-32.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Also, in this specification, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

The invention claimed is:

1. A seating arrangement of a transportation vehicle comprising:
   at least one lower-level seat having a top end, the at least one lower-level seat with a plurality of seating positions, including a resting position, with the at least one lower-level seat including a seat back, a seat base and a leg rest;
   at least one upper-level seat having a bottom end, the at least one upper-level seat with a plurality of seating positions, including a resting position, with the at least one upper-level seat including a seat back, a seat base and a leg rest,
   wherein in the resting position of the at least one upper-level seat or in the resting position of the at least one lower-level seat, at least the corresponding leg rest is adjusted to allow the body of a passenger to rest on the corresponding seat back, the corresponding seat base and the corresponding leg rest,
   wherein at least in one of the plurality of seating positions of the at least one upper-level seat and at least in one of the plurality of seating positions of the at least one lower-level seat, the bottom end of the at least one upper-level seat is positioned below the top end of the at least one lower-level seat, and
   wherein the at least one lower-level seat and the at least one upper-level seat are in a multi-level seating region of the seating arrangement;
   at least one single-level seat in a first single-level seating region of the seating arrangement; and
   at least a first aisle with a first side and a second side,
   wherein the at least one lower-level seat is positioned closer to the first side than the second side of the first aisle, and the at least one single-level seat is positioned closer to the second side than the first side of the first aisle, and
   wherein there is no seat positioned above or below the at least one single-level seat in the first single-level seating region,
   wherein the at least one upper-level seat is a first upper-level seat, and
   wherein the seating arrangement includes:
     at least a second upper-level seat arranged side by side in a row with the first upper-level seat, with the first upper-level seat being closer to the first aisle than the second upper-level seat, and
     an access space in front of at least the first upper-level seat and the second upper-level seat, wherein the access space allows a passenger at the second upper-level seat to access the first aisle without the need to go over the first upper-level seat in any of the seating positions of the first upper-level seat, including the resting position.

2. The seating arrangement of the transportation vehicle as recited in claim 1 further comprising a second aisle with a first side and a second side, the second aisle extending substantially parallel to the first aisle at least around the at least one lower-level seat, wherein at least the at least one lower-level seat is arranged between the first aisle and the second aisle.

3. The seating arrangement of the transportation vehicle as recited in claim 2 further comprising another single-level seat in a second single-level seating region of the seating arrangement,
   wherein the at least one lower-level seat is positioned closer to the first side than the second side of the second aisle,
   wherein the another single-level seat is positioned closer to the second side than the first side of the second aisle, and
   wherein there is no seat above or below the another single-level seat in the second single-level seating region.

4. The seating arrangement of the transportation vehicle as recited in claim 3, wherein the seating arrangement includes:

at least two single-level seats arranged side by side in a row in the first single-level seating region, with at least an area configured for storage above the single-level seats in the first single-level seating region; and at least two single-level seats arranged side by side in a row in the second single-level seating region, with at least an area configured for storage above the single-level seats in the second single-level seating region.

5. The seating arrangement of the transportation vehicle as recited in claim 1,
wherein the seating arrangement includes at least two lower-level seats arranged side by side in a row, and at least a second aisle, and
wherein the at least two lower-level seats and the at least two upper-level seats are arranged between the first and the second aisle.

6. The seating arrangement of the transportation vehicle as recited in claim 1 wherein the seating arrangement includes at least two single-level seats arranged side by side in a row in the first single-level seating region, with at least an area configured for storage above the single-level seats.

7. The seating arrangement of the transportation vehicle as recited in claim 1,
wherein the at least one lower-level seat and the at least one upper-level seat can be in an upright position, and
wherein when in their upright position, the at least one lower-level seat faces in a same direction as the at least one upper-level seat.

8. The seating arrangement of the transportation vehicle as recited in claim 1,
wherein the at least one lower-level seat and the at least one upper-level seat can be in an upright position, and
wherein when in their upright position, the at least one lower-level seat faces in an opposite direction as the at least one upper-level seat.

9. The seating arrangement of the transportation vehicle as recited in claim 1, wherein the at least one single-level seat is arranged either in an acute or an obtuse angle relative to a longitudinal axis of the seating arrangement.

10. The seating arrangement of the transportation vehicle as recited in claim 1, wherein the at least one lower-level seat is arranged either in an acute or an obtuse angle relative to a longitudinal axis of the seating arrangement.

11. The seating arrangement of the transportation vehicle as recited in claim 10, wherein the at least one upper-level seat is arranged either in an acute or an obtuse angle relative to the longitudinal axis of the seating arrangement.

12. The seating arrangement of the transportation vehicle as recited in claim 1 further comprising another seat at a level different from the at least one lower-level seat and different from the at least one upper-level seat, wherein the another seat is in the multi-level seating region of the seating arrangement.

13. The seating arrangement of the transportation vehicle as recited in claim 1, wherein the transportation vehicle is a plane.

14. The seating arrangement of the transportation vehicle as recited in claim 1, wherein the access space is along a direction substantially perpendicular to the first aisle at least around the first upper-level seat.

15. The seating arrangement of the transportation vehicle as recited in claim 1 further comprising:
at least a step to help access the at least one upper-level seat; and
a space below the at least a step configured to be used by a passenger in a lower-level seat.

16. The seating arrangement of the transportation vehicle as recited in claim 10, wherein the seating arrangement includes at least two single-level seats arranged side by side in a row in the first single-level seating region, with at least an area configured for storage above the single-level seats.

17. The seating arrangement of the transportation vehicle as recited in claim 11, wherein the seating arrangement includes at least two single-level seats arranged side by side in a row in the first single-level seating region, with at least an area configured for storage above the single-level seats.

18. The seating arrangement of the transportation vehicle as recited in claim 3, wherein the at least one upper-level seat is arranged either in an acute or an obtuse angle relative to a longitudinal axis of the seating arrangement.

19. The seating arrangement of the transportation vehicle as recited in claim 18, wherein the at least one lower-level seat is arranged either in an acute or an obtuse angle relative to the longitudinal axis of the seating arrangement.

20. The seating arrangement of the transportation vehicle as recited in claim 19, wherein the seating arrangement includes:
at least two single-level seats arranged side by side in a row in the first single-level seating region, with at least an area configured for storage above the single-level seats in the first single-level seating region; and
at least two single-level seats arranged side by side in a row in the second single-level seating region, with at least an area configured for storage above the single-level seats in the second single-level seating region.

21. A seating arrangement of a transportation vehicle comprising:
at least a first aisle with a first side and a second side;
at least one lower-level seat having a top end, the at least one lower-level seat with a plurality of seating positions, including a resting position, with the at least one lower-level seat including a seat back, a seat base and a leg rest, the at least one lower-level seat being positioned closer to the first side than the second side of the first aisle;
a first upper-level seat having a bottom end, the first upper-level seat with a plurality of seating positions, including a resting position, with the first upper-level seat including a seat back, a seat base and a leg rest,
wherein at least in one of the plurality of seating positions of the first upper-level seat and at least in one of the plurality of seating positions of the at least one lower-level seat, the bottom end of the first upper-level seat is positioned below the top end of the at least one lower-level seat, and
wherein in the resting position of the first upper-level seat or in the resting position of the at least one lower-level seat, at least the corresponding leg rest is adjusted to allow the body of a passenger to rest on the corresponding seat back, the corresponding seat base and the corresponding leg rest;
at least a second upper-level seat arranged side by side in a row with the first upper-level seat, with the first upper-level seat being closer to the first aisle than the second upper-level seat; and
an access space in front of at least the first upper-level seat and the second upper-level seat, the access space allowing a passenger at the second upper-level seat to access the first aisle without the need to go over the first upper-level seat in any of the seating positions of the first upper-level seat, including the resting position.

22. The seating arrangement of the transportation vehicle as recited in claim 21, wherein the seating arrangement includes at least two lower-level seats arranged side by side in a row, and at least a second aisle, and wherein the at least two lower-level seats and at least the first and second upper level seats are arranged between the first and the second aisle.

23. The seating arrangement of the transportation vehicle as recited in claim 21, wherein the at least one lower-level seat and the first upper-level seat can be in an upright position, and wherein when in their upright position, the at least one lower-level seat faces in a same direction as the first upper-level seat.

24. The seating arrangement of the transportation vehicle as recited in claim 21, wherein the at least one lower-level seat and the first upper-level seat can be in an upright position, and wherein when in their upright position, the at least one lower-level seat and the first upper-level seat face different directions.

25. The seating arrangement of the transportation vehicle as recited in claim 21, wherein the at least one lower-level seat is arranged either in an acute or an obtuse angle relative to a longitudinal axis of the seating arrangement.

26. The seating arrangement of the transportation vehicle as recited in claim 25, wherein the first upper-level seat is arranged either in an acute or an obtuse angle relative to the longitudinal axis of the seating arrangement.

27. The seating arrangement of the transportation vehicle as recited in claim 21, wherein the transportation vehicle is a plane.

28. The seating arrangement of the transportation vehicle as recited in claim 21, wherein the access space is along a direction substantially perpendicular to the first aisle at least around the first upper-level seat.

29. The seating arrangement of the transportation vehicle as recited in claim 21 further comprising:

at least a step to help access the first upper-level seat; and a space below the at least a step configured to be used by a passenger in a lower-level seat.

* * * * *